US012752556B2

(12) United States Patent
Okawa et al.

(10) Patent No.: US 12,752,556 B2
(45) Date of Patent: Oct. 6, 2026

(54) RECORDING DEVICE

(71) Applicant: SEIKO EPSON CORPORATION, Tokyo (JP)

(72) Inventors: Soshi Okawa, Shiojiri (JP); Sho Aruga, Chino (JP); Haruki Miyasaka, Matsumoto (JP); Nobuhiko Shinozaki, Okaya (JP); Tomoya Kurashina, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 122 days.

(21) Appl. No.: 18/960,962

(22) Filed: Nov. 26, 2024

(65) Prior Publication Data

US 2025/0170844 A1 May 29, 2025

(30) Foreign Application Priority Data

Nov. 28, 2023 (JP) ................................ 2023-200403

(51) Int. Cl.
*B41J 2/045* (2006.01)
*B41J 2/165* (2006.01)
*B41J 11/00* (2006.01)
*B41J 25/308* (2006.01)
*B41J 25/316* (2006.01)
*B41J 29/00* (2006.01)

(52) U.S. Cl.
CPC ......... *B41J 25/308* (2013.01); *B41J 2/16514* (2024.05); *B41J 11/007* (2013.01); *B41J 25/316* (2013.01); *B41J 29/00* (2013.01)

(58) Field of Classification Search
CPC .... B41J 2/04556; B41J 2/04557; B41J 2/155; B41J 2/16505; B41J 2/16511; B41J 2/16514; B41J 2/316; B41J 11/006; B41J 11/007; B41J 25/005; B41J 25/308; B41J 25/3086; B41J 25/3088; B41J 29/00
See application file for complete search history.

(56) References Cited

U.S. PATENT DOCUMENTS 5,838,354 A * 11/1998 Yamada ............... B41J 11/0085 242/530.4
8,777,401 B2 * 7/2014 Matsui ..................... B41J 11/42 347/101

(Continued)

FOREIGN PATENT DOCUMENTS

JP 2008055798 A 6/2023

*Primary Examiner* — Anh T Vo
(74) *Attorney, Agent, or Firm* — WORKMAN NYDEGGER

(57) ABSTRACT

A recording device includes a recording section configured to move in a direction of advancing or retreating with respect to the transport path, a facing section disposed facing the recording section, a motor that is a power source when the recording section is moved, and a movement unit configured to move the recording section by receiving power from the motor, wherein a movement direction of the recording section includes a vertical direction component, the position detecting unit configured to detect a position of the recording section with respect to the transport path is a linear encoder, and the movement unit has a configuration in which, in a case where the recording section is lowered toward the facing section, idle rotation of the motor is allowed after the recording section is placed on the facing section by its own weight.

8 Claims, 28 Drawing Sheets

(56) References Cited

U.S. PATENT DOCUMENTS

| | | | | |
|---|---|---|---|---|
| 2006/0061612 | A1 * | 3/2006 | Satoh | B41J 11/007 347/16 |
| 2016/0214378 | A1 * | 7/2016 | Yoshida | B41J 2/04586 |

* cited by examiner

| | LINE HEAD RAISES | | | LINE HEAD LOWERES | | |
|---|---|---|---|---|---|---|
| | THIRD REGION Am3 (LEVER DRIVE) | FIRST REGION Am1 (CAM DRIVE) | SECOND REGION Am2 (RACK AND PINION DRIVE) | SECOND REGION Am2 (RACK AND PINION DRIVE) | FIRST REGION Am1 (CAM DRIVE) | THIRD REGION Am3 (LEVER DRIVE) |
| HEAD MOVEMENT SPEED | MEDIUM SPEED | LOW SPEED | HIGH SPEED | HIGH SPEED | LOW SPEED | MEDIUM SPEED |
| MOTOR ROTATION SPEED | SPEED 1 | SPEED 1 | SPEED 1 | SPEED 2 | SPEED 2 | SPEED 2 |
| MOTOR DRIVE LOAD | SMALL | SMALL | MEDIUM | SMALL | SMALL | LARGE |
| TORQUE LIMIT VALUE | MAXIMUM | SMALL | MEDIUM | SMALL | SMALL | LARGE |

FIG. 27

RECORDING DEVICE

The present application is based on, and claims priority from JP Application Serial Number 2023-200403, filed Nov. 28, 2023, the disclosure of which is hereby incorporated by reference herein in its entirety.

BACKGROUND

1. Technical Field

The present disclosure relates to a recording device for recording on a medium.

2. Related Art

A printer described in JP-A-2008-55798 includes a guide frame that guides the printing paper, a print head that is held by a carrier that moves above the guide frame, and an alignment sensor that is provided on the carrier. The guide frame is raised and lowered according to the thickness of the printing paper sheet. When the alignment sensor moves above a reference member, a cover slides to expose the reference member. The alignment sensor irradiates light to the reference member and receives reflected light from the reference member and outputs a received light signal corresponding to a received light intensity.

The printer described in JP-A-2008-55798 detects the height position of the guide frame on the basis of the received light signal, that is, detects the gap between the print head and the guide frame.

As described above, in the configuration in which the gap between the print head and the guide frame is detected by irradiating the reference member with light and receiving the reflected light from the reference member, there is a concern that the received light intensity of the reflected light may decrease due to contamination of the reference member. Since this decrease in the received light intensity directly affects the detection accuracy of the gap between the print head and the guide frame, there is a concern that the gap cannot be accurately set.

SUMMARY

To solve the above problem, a recording device of the present disclosure includes a transport path configured to transport a medium; a recording section that is a recording section configured to perform recording on the medium and that is configured to move in a direction of advancing and retreating with respect to the transport path; a facing section disposed facing the recording section; a motor that is a power source when the recording section is moved; a movement unit configured to move the recording section by receiving power from the motor; a position detecting unit configured to detect a position of the recording section with respect to the transport path; and a control section configured to control the motor, wherein a movement direction of the recording section includes a vertical direction component, the position detecting unit is a linear encoder and includes a linear scale provided along the movement direction of the recording section and a first detection section that is a detection section provided in the recording section and that is configured to detect the linear scale, the movement unit has a configuration in which, in a case where the recording section is lowered toward the facing section, idle rotation of the motor is allowed after the recording section is placed on the facing section by its own weight, and the control section grasps the position of the recording section in the movement direction based on a change in the detection signal of the position detecting unit when the recording section is placed on the facing section or a change in the detection signal of the position detecting unit when the recording section rises from a state of being placed on the facing section.

BRIEF DESCRIPTION OF THE DRAWINGS

FIG. 27 is a table showing the relationship between a head movement speed, a motor rotation speed, a motor drive load, and a torque limit value for each of a lever drive region, a cam drive region, and a rack and pinion drive region.

DESCRIPTION OF EMBODIMENTS

Figure 1:
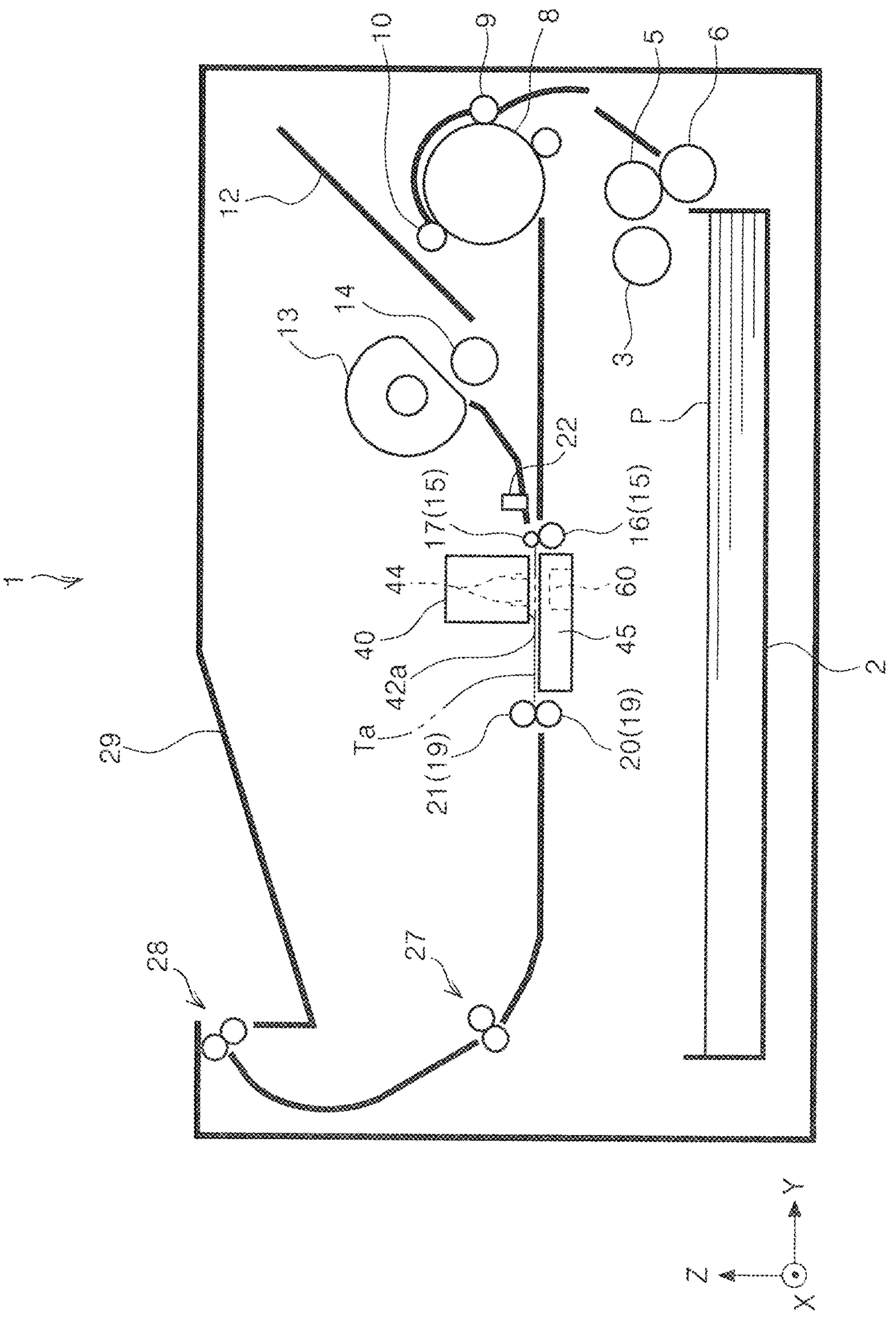
FIG. 1 is a diagram showing an entire medium transport path of a printer.

Hereinafter, the present disclosure will be generally described.

A recording device according to a first aspect includes a transport path configured to transport a medium; a recording section that is a recording section configured to perform recording on the medium and that is configured to move in a direction of advancing and retreating with respect to the transport path; a facing section disposed facing the recording section; a motor that is a power source when the recording section is moved; a movement unit configured to move the recording section by receiving power from the motor; a position detecting unit configured to detect a position of the recording section with respect to the transport path; and a control section configured to control the motor, wherein a movement direction of the recording section includes a vertical direction component, the position detecting unit is a linear encoder and includes a linear scale provided along the movement direction of the recording section and a first detection section that is a detection section provided in the recording section and that is configured to detect the linear scale, the movement unit has a configuration in which, in a case where the recording section is lowered toward the facing section, idle rotation of the motor is allowed after the recording section is placed on the facing section by its own weight, and the control section grasps the position of the recording section in the movement direction based on a change in the detection signal of the position detecting unit when the recording section is placed on the facing section or a change in the detection signal of the position detecting unit when the recording section rises from a state of being placed on the facing section.

According to the present aspect, since the control section grasps the position of the recording section in the movement direction based on the change in the detection signal of the position detecting unit when the recording section is placed on the facing section or the change in the detection signal of the position detecting unit when the recording section rises from the state of being placed on the facing section, it is possible to appropriately grasp the position of the recording section with respect to the facing section and to appropriately set the gap between the recording section and the facing section.

Since the movement unit has a configuration in which, in a case where the recording section is lowered toward the facing section, idle rotation of the motor is allowed after the recording section is placed on the facing section by its own weight, the following operational effects can be obtained.

For example, in the case of a configuration in which the position of the recording section in the movement direction is grasped by detecting an increase in the drive current value of the motor when the recording section contacts with the facing section, a load is applied to the movement unit and there is a concern that breakage of a component may be caused. When the movement unit includes a worm gear mechanism, there is also a concern that excessive surface pressure is generated and causes locking between the worm wheel and the cylindrical worm. However, in the present embodiment, as described above, since the movement unit has a configuration in which, in a case where the recording section is lowered toward the facing section, idle rotation of the motor is allowed after the recording section is placed on the facing section by its own weight, it is possible to suppress the occurrence of such a failure as described above.

Note that the idle rotation of the motor means a state in which the rotation of the motor is not converted into movement of the recording section and in a state in which the motor does not receive a load from the recording section.

In the present specification, the recording section is placed on the facing section by its own weight, which is not limited to a form in which the recording section is placed on the facing section only by its own weight, but also includes a form in which the recording section is placed on the facing section by receiving a pressing force in a direction including a vertically downward component from a spring or the like in addition to its own weight.

A second aspect is an aspect dependent on the first aspect, further includes a rotation detecting unit configured to detect rotation of the motor, wherein the control section grasps the position of the recording section in the movement direction based on the detection signal of the position detecting unit and the detection signal of the rotation detecting unit.

According to the present aspect, the control section grasps the position of the recording section in the movement direction based on the detection signal of the position detecting unit and the detection signal of the rotation detecting unit, it is possible to accurately grasp the position of the recording section in the movement direction.

A third aspect is an aspect dependent on the second aspect, wherein the rotation detecting unit is a rotary encoder and includes a rotary scale provided on an output shaft of the motor and a second detection section configured to detect the rotary scale.

According to the present aspect, since the rotation detecting unit includes the rotary scale provided on the output shaft of the motor and the second detection section configured to detect the rotary scale, it is possible to accurately detect the rotation of the motor.

A fourth aspect is an aspect dependent on the third aspect, wherein the movement unit includes a cylindrical worm driven by the motor and a worm wheel that is configured to mesh with the cylindrical worm and that is configured to rotate with rotation of the cylindrical worm.

Since the movement unit includes the worm gear mechanism, when an excessive surface pressure is generated between the worm wheel and the cylindrical worm, there is also a concern that locking may occur. However, by the operational effects of the first embodiment described above, since the excessive load is not applied to the movement unit when grasping the position of the recording section with respect to the facing section, it is possible to suppress the occurrence of the lock.

In addition, by the worm gear mechanism, it is possible to increase the deceleration ratio when power is transmitted from the motor to the recording section. As a result, the resolution of the rotary encoder can be made higher than the resolution of the linear encoder and the recording section can be accurately positioned with respect to the facing section.

The resolution means the number of pulses output per unit operation amount. For example, the resolution of the rotary encoder is the number of pulses output with respect to one rotation of the output shaft of the motor. The resolution of the linear encoder is the number of pulses output with respect to a unit movement amount of the recording section.

A fifth aspect is an aspect dependent on the first aspect, wherein the control section sets an origin position of the recording section in the movement direction based on a position of the recording section at a time when a signal change of the linear encoder disappears during rotation of the motor when the recording section is lowered toward the facing section or a position of the recording section at a time point when the signal change of the linear encoder appears during rotation of the motor when the recording section is raised from a state of being placed on the facing section.

According to the present aspect, it is possible to appropriately set the origin in the movement direction of the recording section by using the signal change of the linear encoder. As a result, the positioning accuracy of the recording section is improved.

Note that the present aspect is not limited to the first aspect and may be dependent on any of the second to the fourth aspects.

A sixth aspect is an aspect dependent on the first aspect, wherein the recording section includes a protruding section protruding toward the facing section and by the protruding section contacting the facing section, the recording section is placed on the facing section by its own weight.

According to the present aspect, since the recording section includes the protruding section protruding toward the facing section and by the protruding section is in contact with the facing section, the recording section is placed on the facing section by its own weight, it is possible to avoid contact between a portion where recording is performed on the medium in the recording section and the facing section. As a result, the occurrence of damage in the portion where recording is performed on the medium in the recording section can be suppressed and contamination of the facing section can be suppressed.

Note that the present aspect is not limited to the first aspect and may be dependent on any of the second to the fifth aspects.

A seventh aspect is an aspect dependent on the first aspect, wherein a movement region of the recording section includes a first region and a second region farther from the transport path than the first region, the movement unit includes a first movement section configured to move the recording section in the first region and a second movement section configured to move the recording section in the second region, the recording section when transitioning from the first region to the second region, transitions from a state of being moved by the first movement section to a state of being moved by the second movement section and when transitioning from the second region to the first region, transition from a state of being moved by the second movement section to a state of being moved by the first movement section, and the first movement section and the second movement section are both driven by the motor.

According to the present aspect, the movement unit configured to move the recording section includes the first movement section configured to move the recording section in the first region and the second movement section configured to move the recording section in the second region. The first movement section and the second movement section, since they are driven by a common motor, a cost increase of the device can be suppressed and miniaturization of the device can be achieved. By configuring the movement unit to include the first movement section and the second movement section, it is possible to make the movement amount of the recording section with respect to one rotation of the output shaft of the motor different between the first movement section and the second movement section. As a result, when the movement region includes an area in which the recording section is desired to be moved with high accuracy and an area in which the movement amount of the recording section is desired to be secured, it is possible to appropriately respond to such a request.

Note that the present aspect is not limited to the first aspect and may be dependent on any of the second to the sixth aspects.

An eighth aspect is an aspect dependent on the seventh aspect, wherein the first movement section includes a cam that is a cam rotated by the power of the motor and that is configured to move the recording section by being rotated in a state of supporting the recording section and the second movement section includes a rack provided in the recording section and a pinion that is a pinion configured to mesh with the rack and that is configured to move the recording section by being rotated by the power of the motor.

According to the present aspect, since the first movement section includes the cam that is the cam rotated by the power of the motor and that is configured to move the recording section by being rotated in a state of supporting the recording section, it is possible to finely adjust the position of the recording section at a position close to the medium transport path. As a result, the recording section can be positioned at an appropriate position in accordance with the thickness of the medium.

The second movement section includes the rack provided in the recording section and the pinion that is a pinion configured to mesh with the rack and that is configured to move the recording section by being rotated by the power of the motor. By this, even when the second region is secured to be large, the recording section can be moved to a large extent in response to this, it contributes to the convenience of maintenance work and the like.

Hereinafter, the present disclosure will be described in detail.

Hereinafter, an inkjet printer 1 will be described as an example of a recording device that performs recording on a medium. Hereinafter, the inkjet printer 1 is simply referred to as the printer 1.

Note that in the X-Y-Z coordinate system shown in each diagram, an X-axis direction is a device width direction and is a width direction of the medium on which the recording is performed. As viewed from an operator of the printer 1, the +X direction is the left side and the −X direction is the right side. Hereinafter, the X-axis direction may be referred to as a medium width direction or simply a width direction.

A Y-axis direction is a device depth direction and is a direction along a medium transport direction at the time of recording. The +Y direction is a direction from a rear surface of the device to a front surface and the −Y direction is a direction from the front surface of the device to the rear surface. In the present embodiment, among the side surfaces constituting the periphery of the printer 1, the side surface in the +Y direction is a device front surface and the side surface in the −Y direction is a device rear surface.

A Z-axis direction is a direction along a vertical direction and is a device height direction. The +Z direction is a vertically upward direction and the −Z direction is a vertically downward direction.

Note that in the following, the direction in which the medium is sent is referred to as "downstream" and the opposite direction is referred to as "upstream" in some cases.

Medium Transport Path of Printer

Hereinafter, the medium transport path of the printer 1 will be described with reference to FIG. 1. As shown in FIG. 1, the printer 1 is provided with a medium accommodation cassette 2 at the bottom of the device. Reference symbol P denotes the medium accommodated in the medium accommodation cassette 2. An example of the medium is a recording paper sheet. The medium accommodation cassette 2 is provided so as to be attachable to and detachable from the front side of the device.

A pickup roller 3 driven by a motor (not shown) is provided on the upper portion of the medium accommodation cassette 2. The pickup roller 3 can advance and retreat with respect to the medium accommodated in the medium accommodation cassette 2 and sends out the medium from the medium accommodation cassette 2 in the +Y direction by rotating in contact with the medium accommodated in the medium accommodation cassette 2.

A feed roller 5 driven by a motor (not shown) and a separation roller 6 to which rotational torque is applied by a torque limiter (not shown) are provided downstream of the medium accommodation cassette 2. The medium sent out from the medium accommodation cassette 2 is separated by being nipped by the feed roller 5 and the separation roller 6 and is further sent downstream.

An inversion roller 8 driven by a motor (not shown) is provided downstream of the feed roller 5 and the separation roller 6. A first nip roller 9 and a second nip roller 10 are provided around the inversion roller 8, the medium is nipped by the inversion roller 8 and the first nip roller 9, and further nipped and transported by the inversion roller 8 and the second nip roller 10. The transport direction of the medium is inversed from the +Y direction to the −Y direction by the inversion roller 8, and the medium is transported downstream.

A first transport roller pair 15 including a drive roller 16 driven by a motor (not shown) and a driven roller 17 capable of being driven to rotate is provided downstream of the inversion roller 8. The medium is transported to a position facing the line head 40 by the first transport roller pair 15.

Note that, in addition to the medium feeding path from the medium accommodation cassette 2, the printer 1 includes a medium feeding path from a medium support section 12. The medium support section 12 supports the medium in an inclined posture and the supported medium is transported to the first transport roller pair 15 by a feed roller 13 driven by a motor (not shown). Reference symbol 14 denotes a separation roller to which rotation torque is applied by a torque limiter (not shown).

A medium detection section 22 is provided upstream of the first transport roller pair 15. A control section 100 (see FIG. 4) (to be described later) can determine, based on detection information of the medium detection section 22, the position of the leading edge of the medium with respect to the line head 40 and, for example, can position the medium at the recording start position.

The line head 40 is an example of a recording section that performs recording on the medium. The line head 40 is an example of a liquid ejection head that ejects ink, which is an example of a liquid, onto the medium to perform recording. The line head 40 is a liquid ejection head in which a plurality of nozzles 44 that eject ink are arranged so as to cover the entire area in the medium width direction. The line head 40 is elongated in the medium width direction and is configured as a liquid ejection head capable of recording on the entire medium width area without moving in the medium width direction.

Reference symbol 42*a* denotes a head surface that faces the medium. The head surface 42*a* may also be referred to as a liquid ejection surface or a nozzle surface. The head surface 42*a* is formed by a plate member 42 (see FIG. 2) (to be described later). The head surface 42*a* is parallel to the medium transport direction, that is, the Y-axis direction, at a position facing the line head 40. The head surface 42*a* is parallel to the X-Y plane. The two dot chain line indicated by a reference symbol Ta is the medium transport path in a gap between the line head 40 and a facing section 45. The medium transport path Ta is parallel to the X-Y plane.

The printer 1 includes an ink accommodation section (not shown) and the ink ejected from the line head 40 is supplied from the ink accommodation section to the line head 40 via an ink tube (not shown).

The facing section 45 is provided at a position facing the head surface 42*a* of the line head 40. The facing section 45 according to the present embodiment includes an upstream support section 46 (see FIG. 5) and a shutter 47 (see FIG. 5) (to be described later) and defines a gap between the medium and the head surface 42*a* by supporting the medium using the upstream support section 46 and the shutter 47. Hereinafter, the gap between the facing section 45 and the head surface 42*a* may be referred to as a platen gap.

The line head 40 is provided so as to be movable in a direction of advancing and retreating with respect to the facing section 45, that is, in an adjustment direction of the platen gap. The adjustment direction of the platen gap in the present embodiment is parallel to the Z-axis direction.

Hereinafter, the movement of the line head 40 or other components in the +Z direction may be referred to as "raised", and the movement in the −Z direction may be referred to as "lowered".

Figure 4:
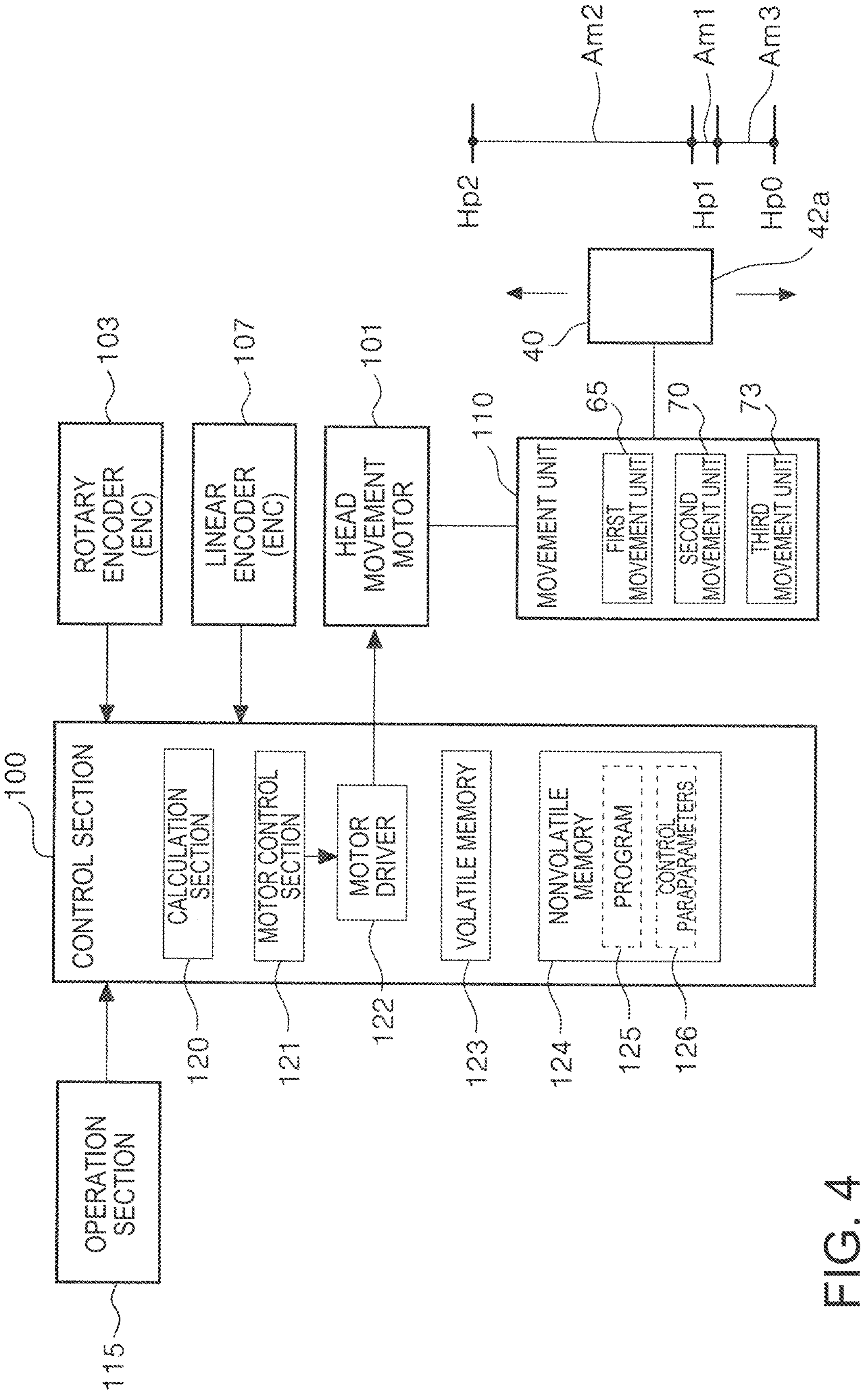
FIG. 4 is a block diagram showing a control system relating to the movement of the line head.

As shown in FIG. 4, the line head 40 is moved along the Z-axis direction by the obtaining power of a head movement motor 101, which is an example of a drive source. Here, the movement operation of the line head 40 will be described with reference to FIG. 4. The power of the head movement motor 101 is converted into the Z-axis direction operation of the line head 40 by a movement unit 110. The movement unit 110 will be described later.

The control section 100 for controlling the head movement motor 101 raises and lowers the line head 40 and adjusts the platen gap, based on the medium type included in received print data, according to the thickness of the medium. For example, assuming the position of the line head 40 is a first recording position while recording is performed on plain paper, then the line head 40 is positioned at a second recording position raised from the first recording position while recording is performed on special paper that is thicker than plain paper. If the medium will contact with the line head 40 even when the second recording position is selected, it is positioned at the third recording position that is raised from the second recording position.

In FIG. 4, reference symbols Am1, Am2, and Am3 indicate movement regions of the line head 40, with the head surface 42*a* as the standard. The movement region of the line head 40 has the first region Am1 and the second region Am2, which is farther from the medium transport path Ta than the first region Am1. The first region Am1 includes the first recording position, the second recording position, and the third recording position described above. Of course, the first region Am1 may further include other recording positions. In the present embodiment, the movement region of the line head 40 includes the third region Am3, which is lower than the first region Am1.

When the line head 40 moves to a position Hp2, which is the uppermost position of the second region Am2, the gap between the facing section 45 and the head surface 42*a* becomes the largest. By this, it is possible to remove jammed medium when a jam occurs. Hereinafter, the position Hp2 is referred to as a jam processing position of the line head 40.

The position Hp1 is a recording position when recording is performed on the medium. The position Hp1 changes according to the type of medium as described above. That is, the recording position Hp1 includes the first recording position, the second recording position, and the third recording position described above.

The position Hp0 is the lowest position of the third region Am3. This position is a position where a cap section 61 (to be described later) covers the head surface 42*a* and hereinafter the position Hp0 is referred to as a capping position of the line head 40.

Returning to FIG. 1, a second transport roller pair 19 including a drive roller 20 driven by a motor (not shown) and a driven roller 21 capable of being driven to rotate is provided downstream of the line head 40. The medium on which recording has been performed is sent downstream by the second transport roller pair 19.

A third transport roller pair 27 is provided downstream of the second transport roller pair 19 and a discharge roller pair 28 is provided downstream of the third transport roller pair 27. A portion between the third transport roller pair 27 and the discharge roller pair 28 is configured as a face-down discharge path and the medium on which recording has been performed is discharged to a discharge tray 29 by the discharge roller pair 28 in a state where the most recent recording surface faces downward.

Configuration of Line Head

Subsequently, the line head 40, which is an example of the liquid ejection head, will be further described with reference to FIG. 2.

Figure 2:
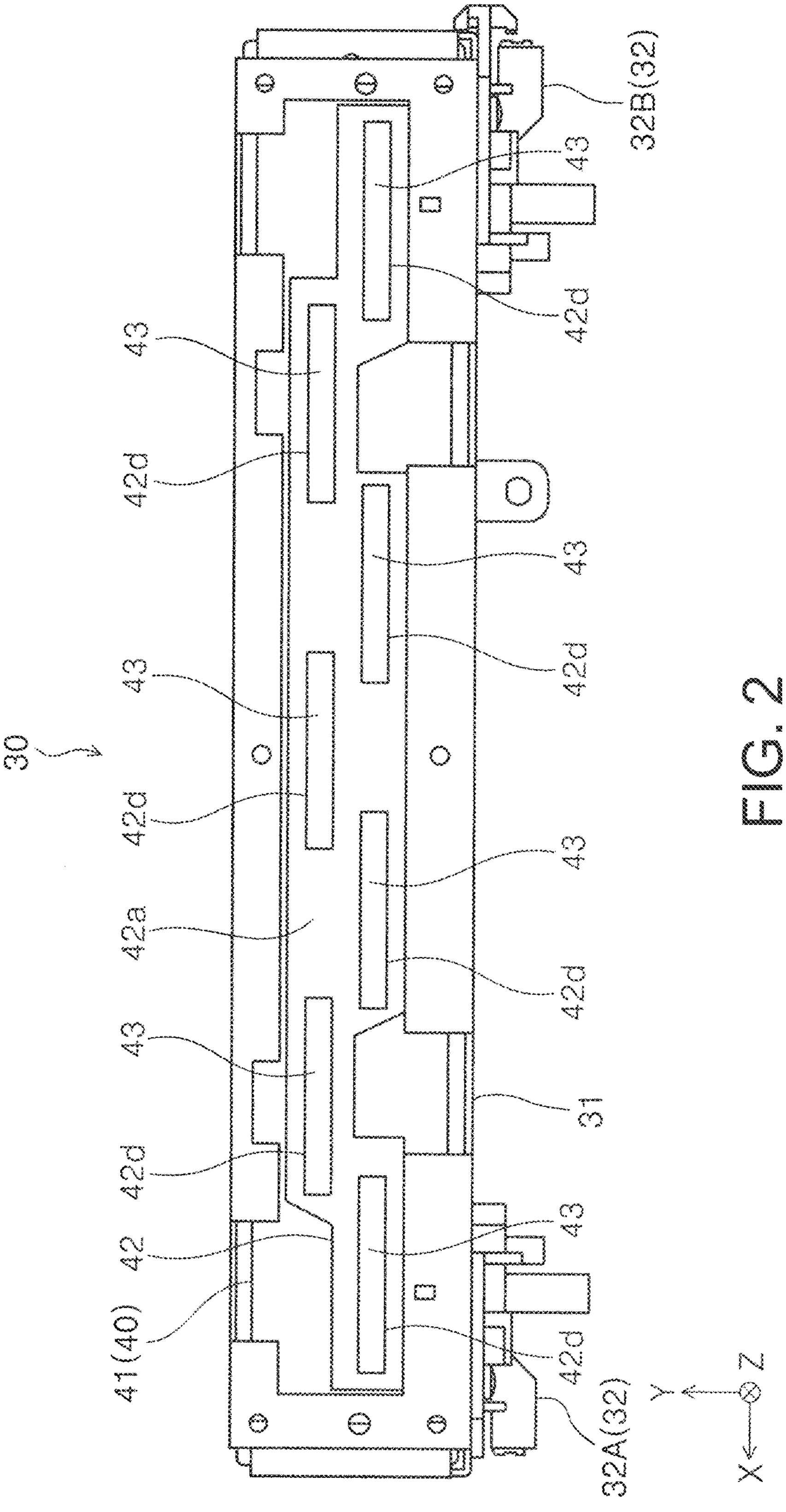
FIG. 2 is a plan view of a head surface of a line head.

As shown in FIG. 2, the line head 40 includes the plate member 42 on a base 41. The base 41 is a structure in which a flow path for supplying ink supplied from the ink accommodation section (not shown) to head chips 43 are provided.

The plate member 42 is a metallic plate and forms the head surface 42*a*.

A plurality of openings 42*d* are formed in the plate member 42 and a head chip 43 is provided in each of the openings 42*d*. The head chips 43 are provided with the plurality of nozzles 44 (see FIG. 1) along the medium width direction. The plate member 42 and the head chips 43 are provided so as to be flush with each other.

The head chips 43 are alternately disposed at an upstream position and a downstream position along the X-axis direction, that is, the medium width direction. In the present embodiment, three head chips 43 at the upstream position are provided along the medium width direction and four head chips 43 at the downstream position are provided along the medium width direction. By this, the cap sections 61 (to be described later) covering the head chips 43 are alternately disposed at the upstream position and the downstream position along the medium width direction.

The line head 40 is provided on a unit frame 31 and constitutes a head unit 30 together with the unit frame 31. The head unit 30 is a structure including the line head 40. Therefore, it can be said that the members constituting the head unit 30 are members provided in the line head 40.

The line head 40 or the head unit 30 is an example of the recording section that performs recording on the medium. The power of the head movement motor 101 (see FIG. 4) is transmitted to the unit frame 31 and, by this, the head unit 30, that is, the line head 40, moves in the Z-axis direction.

Configuration of Cap Unit

Figure 3:
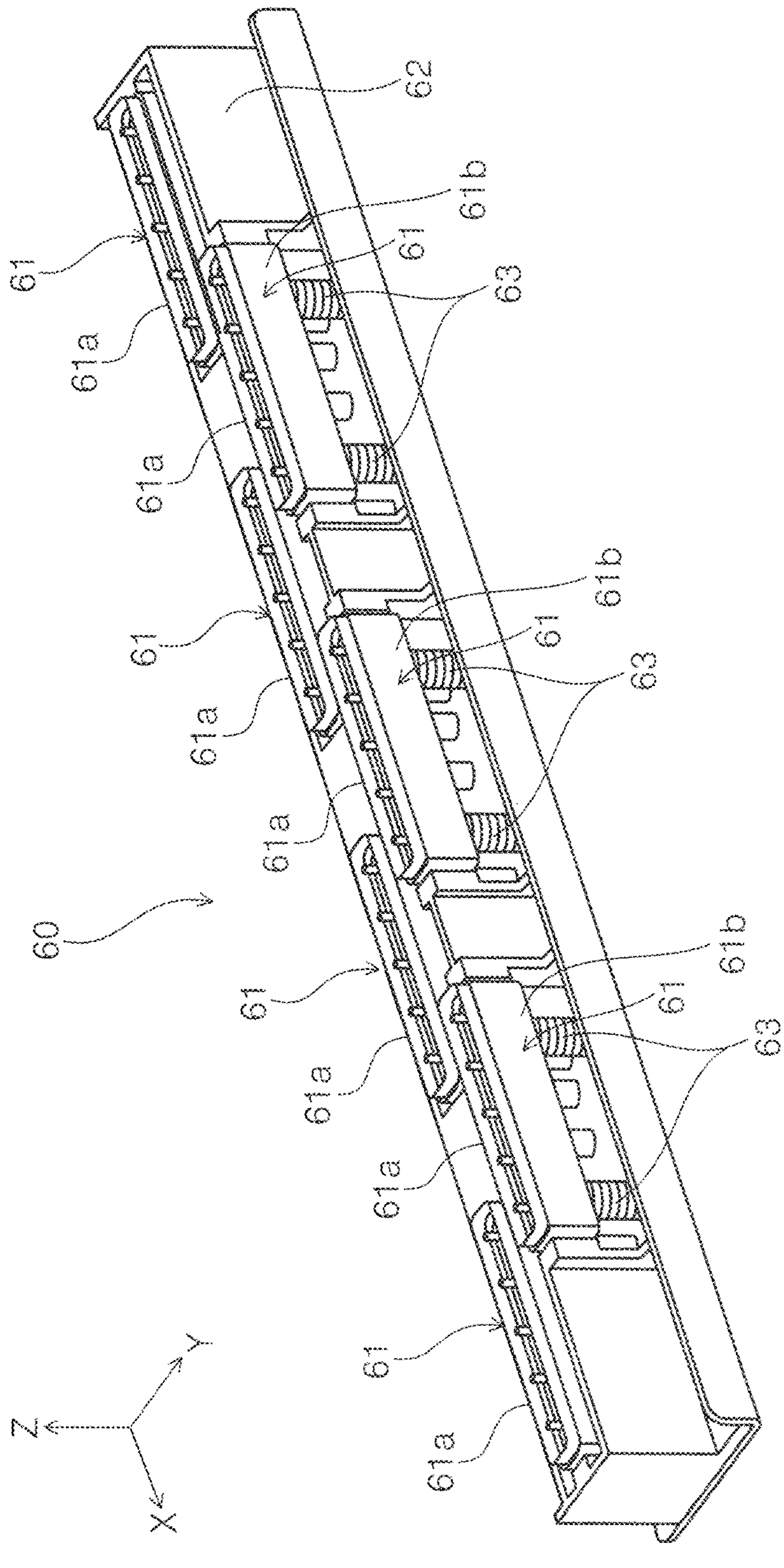
FIG. 3 is a perspective view of a cap unit.

Next, the cap unit 60 will be described with reference to FIG. 3.

The cap unit 60 includes the cap section 61 that covers the head chip 43. Since the head chip 43 is provided on the head surface 42*a*, the cap section 61 can also be referred to as a member that covers a part of the head surface 42*a*. Since the nozzles 44 are provided in the head chips 43, the cap section 61 can also be referred to as a member that covers the nozzles 44.

The plurality of cap sections 61 constitutes the cap unit 60. The cap unit 60 is provided on the lower side of the facing section 45.

The cap unit 60 includes the plurality of cap sections 61 on a base section 62.

The cap section 61 forms the elongated shape in the X-axis direction and provides cap main body sections 61*b* formed of a resin material or the like and elastic sections 61*a* formed of an elastic material such as rubber, which is a portion in contact with the head surface 42*a*. The cap main body sections 61*b* are held by a base section 62 so as to be displaceable in the Z-axis direction and a movement limit in the +Z direction is defined by a restricting section (not shown) formed on the base section 62. The cap main body sections 61*b* are pressed in the +Z direction by cap springs 63, which are an example of a pressing member. In the present embodiment, two cap springs 63 are provided for one cap main body section 61*b*.

A waste liquid tube (not shown) is connected to each cap main body section 61*b*. The waste liquid tube is connected to a pump (not shown). When the pump is operated in a state of the cap section 61 covering the head surface 42*a*, a negative pressure is generated in the cap section 61 and, by this, ink is sucked from the nozzles 44 of the line head 40.

The cap sections 61 are alternately disposed at the upstream position and the downstream position along the X-axis direction, that is, the medium width direction. In the present embodiment, three cap sections 61 are provided at the upstream position, that is, in the +Y direction and four cap sections 61 are provided at the downstream position, that is, in the −Y direction.

Such an arrangement of the cap sections 61 corresponds to the arrangement of the head chips 43 in the line head 40.

The cap section 61 is exposed by moving the shutter 47 (to be described later) from a closed position to an open position.

Configuration of Facing Section

Next, the facing section 45 will be further described with reference to FIG. 5.

Figure 5:
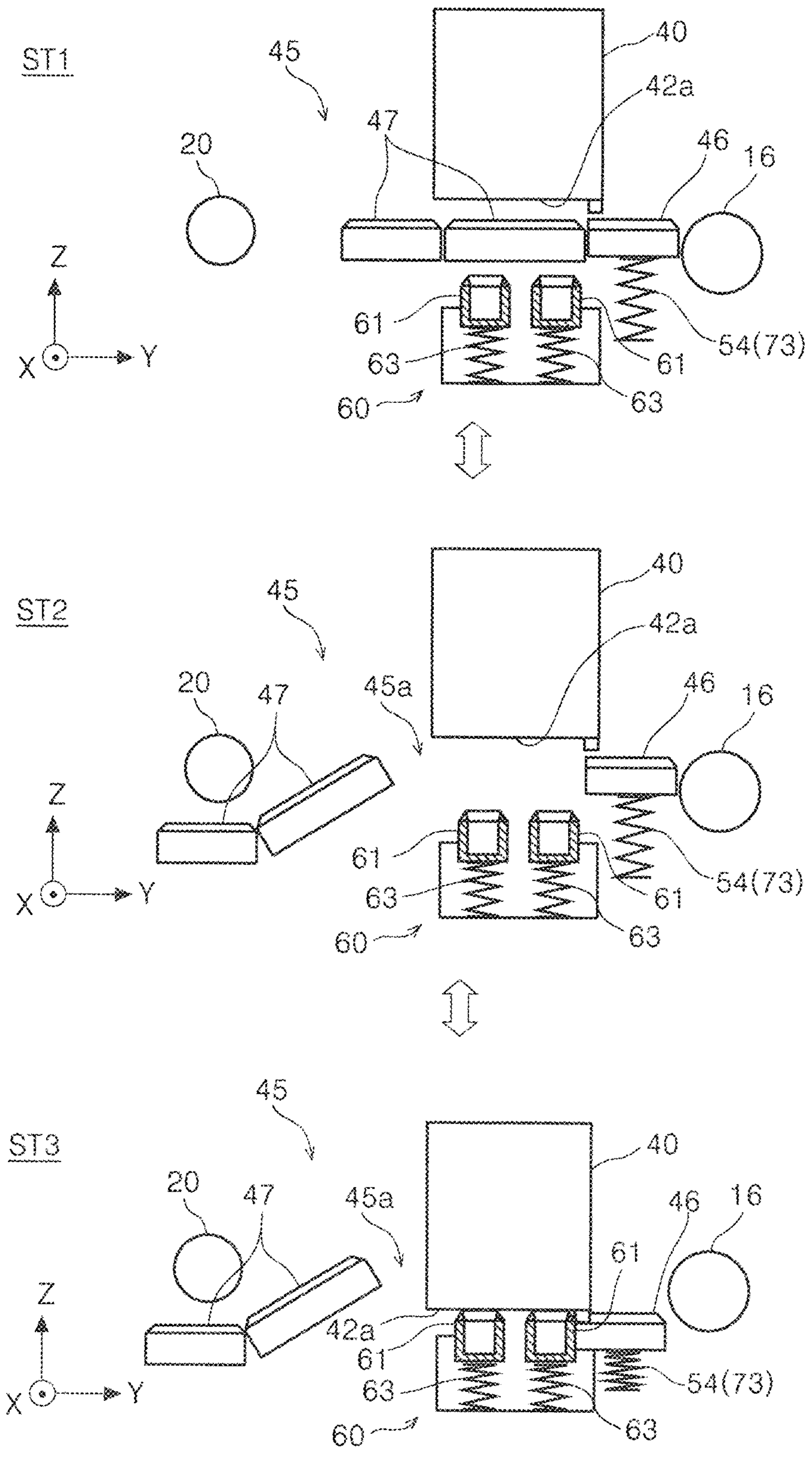
FIG. 5 is a diagram showing the transition of an operation of the line head and the shutter.

As shown in FIG. 5, the facing section 45 that faces the line head 40 includes the upstream support section 46 and the shutter 47 that is positioned downstream of the upstream support section 46. The shutter 47 is movable along the medium transport direction and is movable between the closed position indicated by a state ST1 in FIG. 5 and the open position indicated by states ST2 and ST3 in FIG. 5 by the power of a motor (not shown).

When the shutter 47 moves to the open position, an opening 45*a* is formed in the facing section 45 and the cap sections 61 are exposed inside the opening 45*a*.

In a state where the shutter 47 is in the open position, by lowering the line head 40 as shown in the state ST3 in FIG. 5, the cap sections 61 can cover the head chips 43. At that time, the cap section 61 against the pressing force of the cap spring 63 is slightly pushed down in the −Z direction, by this, the cap section 61 is brought into close contact with the head surface 42*a*. Note that when the cap sections 61 are brought into close contact with the head surface 42*a* in this manner, the lowering of the line head 40 may be referred to as a "capping operation".

In a recording standby state at the time of power of the device being turned off or power being turned on, the control section 100 causes the head chips 43 to be covered state with the cap sections 61 in a state where the shutter 47 is in the open position. When a flushing operation to prevent clogging of the nozzles 44, the control section 100 causes it to eject ink toward the cap sections 61 in a state where the shutter 47 (to be described later) is in the open position.

When recording is performed by receiving recording data, the control section 100 raises the line head 40 to separate the head surface 42*a* from the cap sections 61 and moves the shutter 47 (to be described later) to the closed position. By this, it suppresses the transported medium from entering the opening 45*a* of the facing section 45 or from losing the posture of the medium. In addition, foreign matter such as paper dust entering the cap sections 61 during transport of the medium and impairing the performance of the cap sections 61 is suppressed.

Note that in the present embodiment, the shutter 47 is moved between the closed position and the open position by a link mechanism 35 (see FIG. 6), which is operated by the reverse rotation of the drive roller 20 constituting the second transport roller pair 19.

Note that the upstream support section 46 is provided so as to be movable in the Z-axis direction and is pressed in the +Z direction by a coil spring 54, which is an example of a pressing member. However, the movement of the upstream support section 46 in the +Z direction is restricted at a predetermined position by contact with a restricting section (not shown).

Then, when performing the capping operation, the line head 40 pushes down the upstream support section 46 in the −Z direction against the pressing force of the coil spring 54.

Configuration of Movement Unit for Moving Line Head

Hereinafter, the movement unit 110 for converting the power of the head movement motor 101 (see FIG. 4) to the operation in the Z-axis direction of the line head 40 will be described.

First, the position of the line head 40 in the Z-axis direction can be grasped by the control section 100 based on detection information transmitted from a rotary encoder 103 (see FIG. 4) and detection information transmitted from a linear encoder 107 (see FIG. 4). Note that hereinafter, the term "encoder" will be abbreviated to "ENC".

Figure 9:
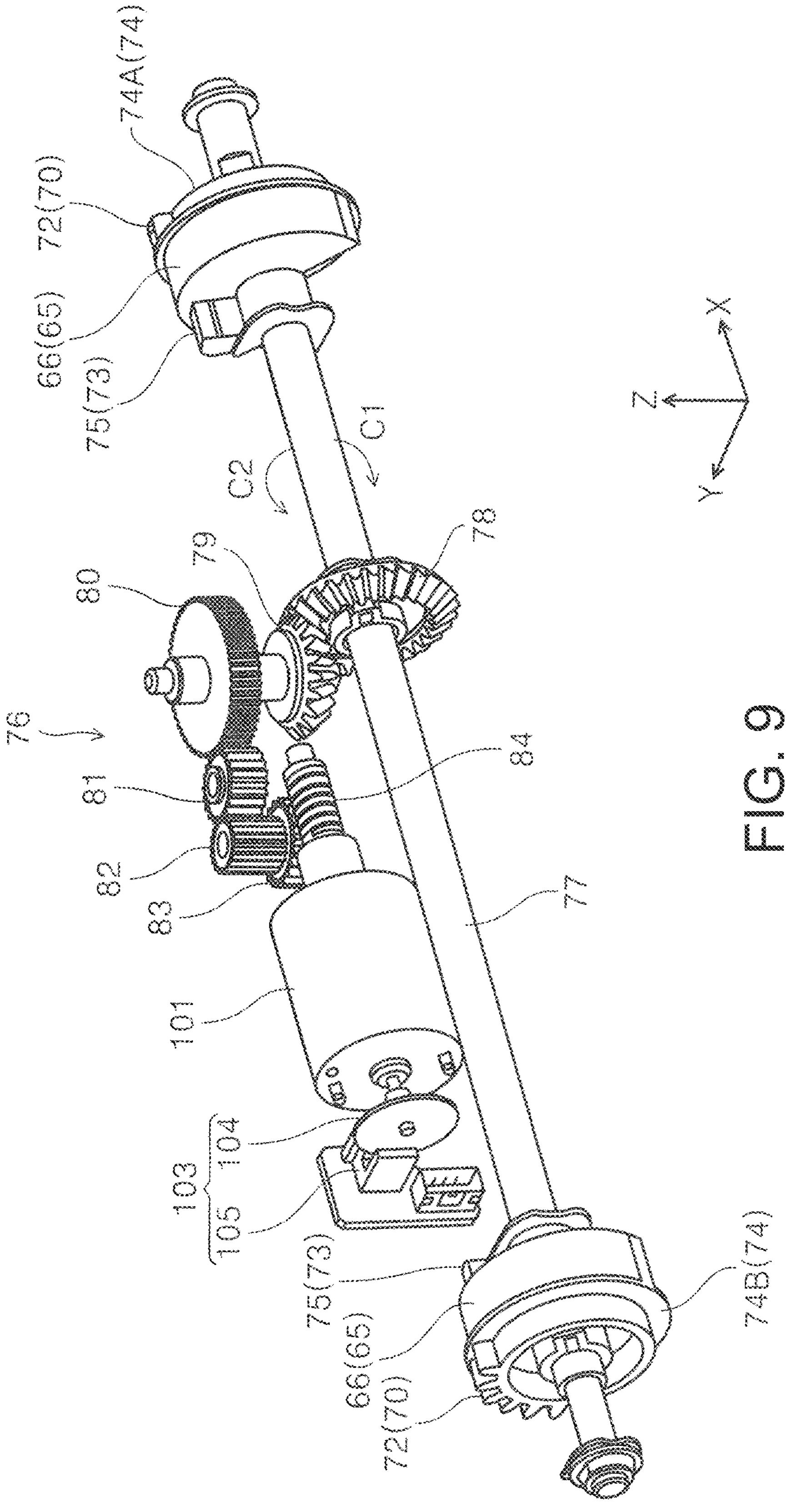
FIG. 9 is a perspective view of a deceleration mechanism that transmits power from a head movement motor to the rotating body.
Figure 10:
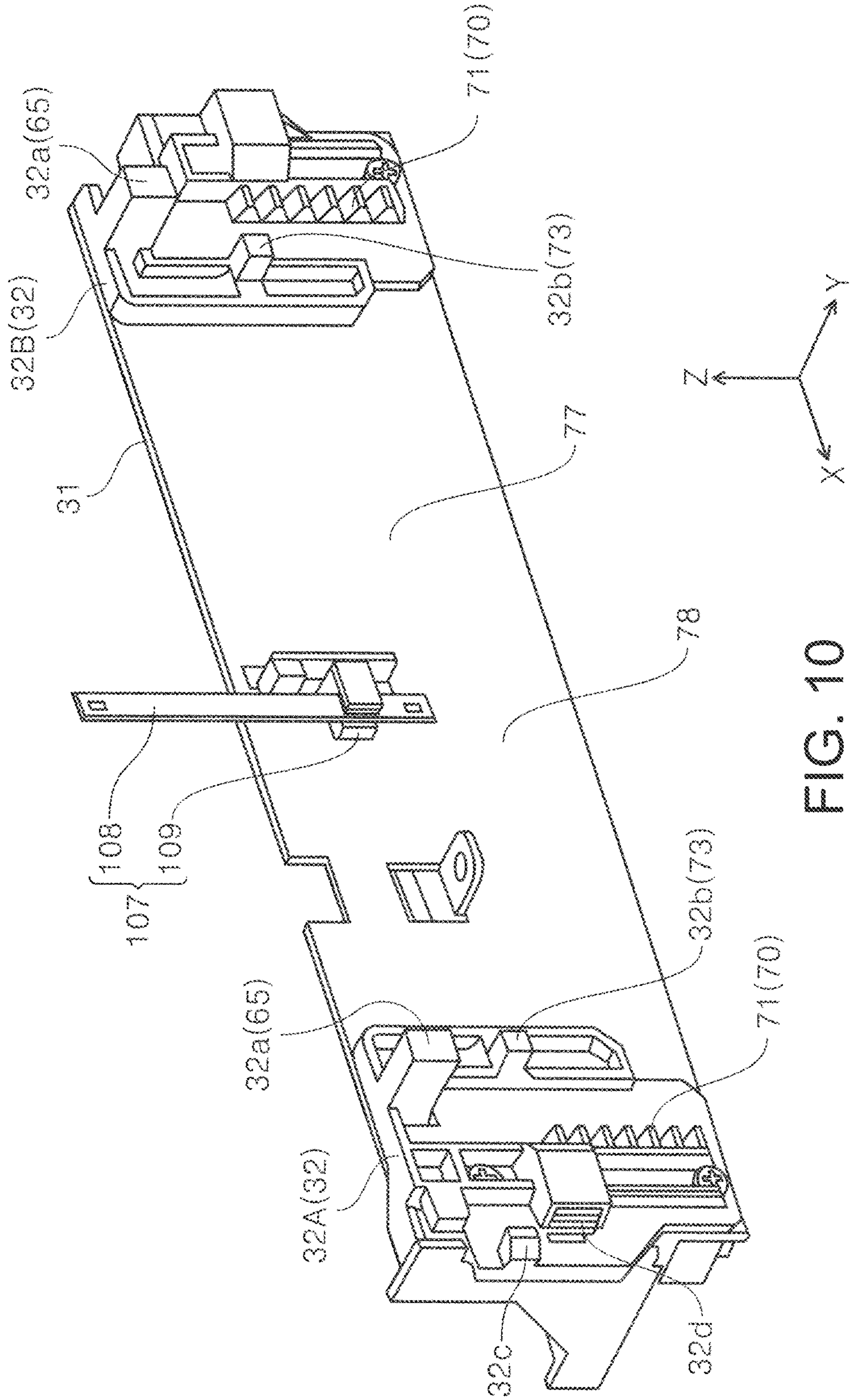
FIG. 10 is a perspective view of the head unit and a linear encoder.

The rotary ENC 103 includes a rotary scale 104 provided on a motor output shaft of the head movement motor 101 as shown in FIG. 9 and a second detection section 105 for detecting the rotation of the rotary scale 104. The rotary ENC 103 detects the translucent scale of the rotary scale 104 and outputs a detection pulse signal including a number of pulses proportional to a rotation amount of the motor output shaft.

The linear ENC 107 includes a linear scale 108 provided on a guide frame 33 (to be described later) and a first detection section 109 for detecting the movement of the linear scale 108. The linear ENC 107 detects the translucent scale of the linear scale 108 and outputs a detection pulse signal including a number of pulses proportional to a movement amount of the head unit 30.

As described above, the head unit 30 including the line head 40 has the unit frame 31 as a base and the line head 40 is provided on the unit frame 31.

Figure 8:
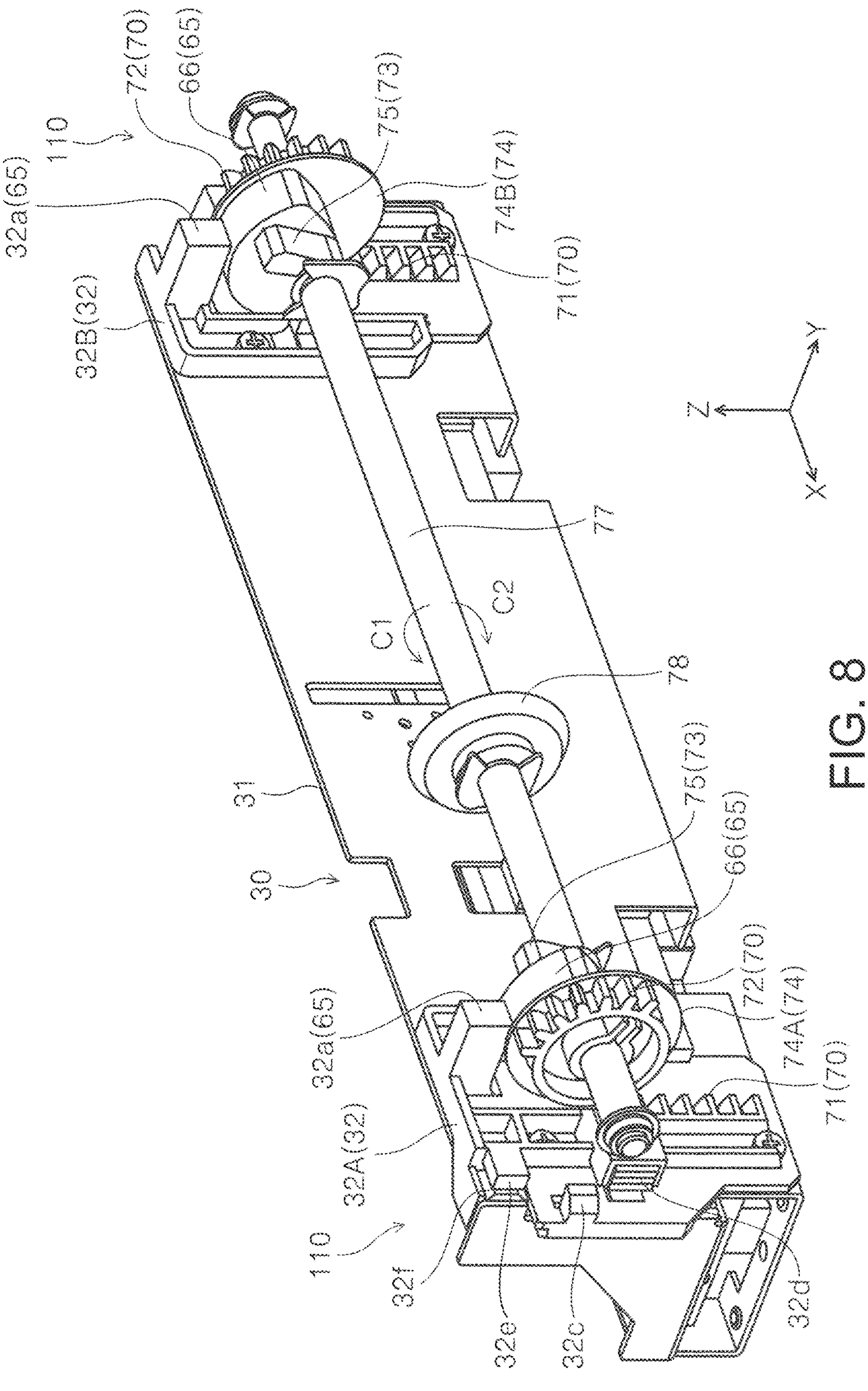
FIG. 8 is a perspective view of the head unit and a rotating body.

Rack members 32 are provided in the unit frame 31 at an end portion of the +X direction and an end portion of the −X direction as shown in FIG. 8. In the unit frame 31, the rack member 32 provided at the end portion in the +X direction is denoted by reference symbol 32A and the rack member 32 provided at the end portion in the −X direction is denoted by reference symbol 32B. Hereinafter, when it is not necessary to distinguish between the rack members 32A and 32B, they are collectively referred to as the rack member 32.

Figure 6:
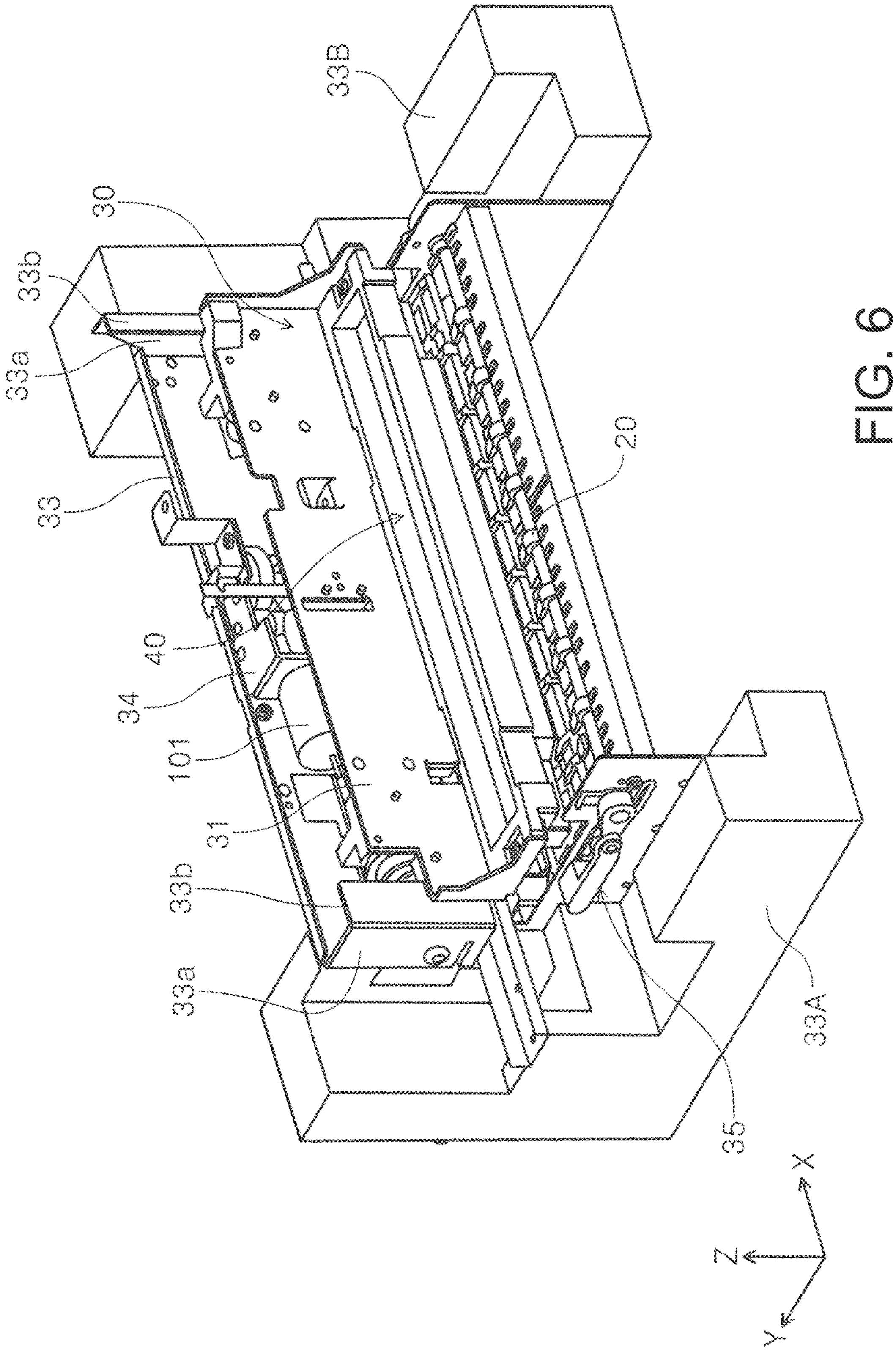
FIG. 6 is a perspective view of a head unit, a guide frame, and a base frame.
Figure 7:
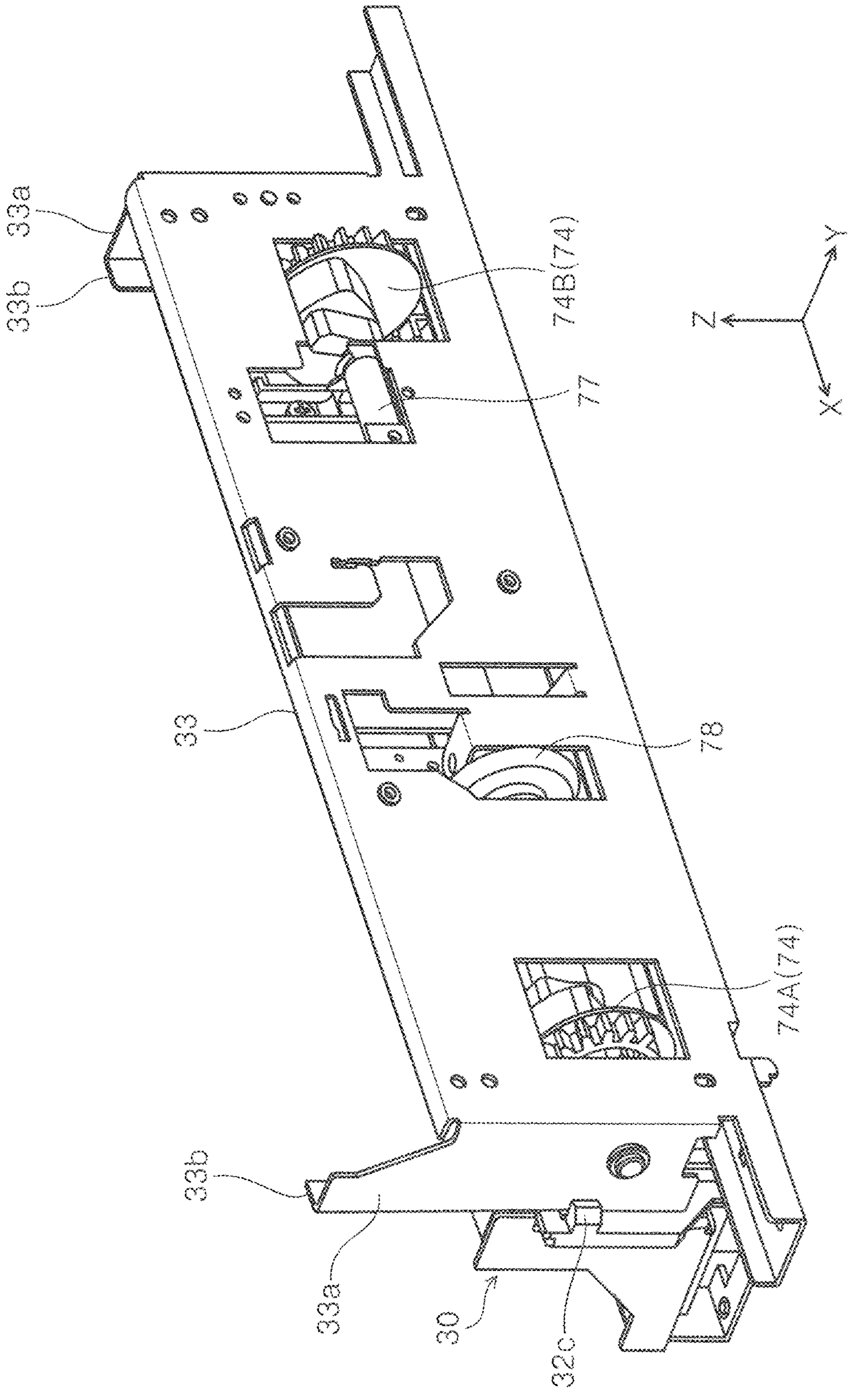
FIG. 7 is a perspective view of the guide frame and the head unit.

The guide frame 33 as shown in FIG. 7 is provided in the +Y direction with respect to the unit frame 31. In the guide frame 33, first guide sections 33*a* are formed at the end portion in the +X direction and the end portion in the −X direction. The first guide sections 33*a* are portions that form surfaces parallel to the Y-Z plane. Furthermore, second guide sections 33*b* are formed at end portions in the −Y direction of the first guide sections 33*a*. The second guide sections 33*b* are portions that form surfaces parallel to the X-Z plane. Note that the guide frame 33 is supported by base frames 33A and 33B provided at a gap in the X-axis direction as shown in FIG. 6.

The rack member 32 is provided with guided sections 32*c* and 32*d* as shown in FIG. 8. By the guided sections 32*c* and 32*d*, it is possible to sandwich the first guide section 33*a* of the guide frame 33 in the X-axis direction. The rack member 32 is provided with guided sections 32*e* and 32*f*. It is possible to sandwich the second guide section 33*b* of the guide frame 33 by the guided sections 32*e* and 32*f* in the Y-axis direction. With such a configuration, the unit frame 31, that is, the head unit 30, is guided in the Z-axis direction by the guide frame 33.

Note that the shape of the rack member 32B is line symmetric with the shape of the rack member 32A with respect to the Y-axis as the axis of symmetry at an intermediate position between the rack member 32A and the rack member 32B in the X-axis direction.

Next, as shown in FIG. 7, a shaft 77 parallel to the X-axis direction is rotatably axial supported by the guide frame 33. A rotating body 74 is provided in the vicinity of the +X direction end portion of the shaft 77 and in the vicinity of the −X direction end portion. The rotating body 74 provided in the vicinity of the end portion of the shaft 77 in the +X direction is denoted by reference symbol 74A and the rotating body 74 provided in the vicinity of the end portion in the −X direction is denoted by reference symbol 74B. Hereinafter, when it is not necessary to distinguish between the rotating bodies 74A and 74B, they are collectively referred to as the rotating body 74.

Note that the shape of the rotating body 74B is line symmetric with the shape of the rotating body 74A with respect to the Y-axis as the axis of symmetry at an intermediate position between the rotating body 74A and the rotating body 74B in the X-axis direction.

The rotating body 74 rotates integrally with the shaft 77. Note that in the following description, the rotation direction of the shaft 77 and the rotating body 74, and also a pinion 72, a cam 66, and a push-down section 75 (to be described later) may be represented by reference symbols C1 and C2 shown in the drawings.

A first bevel gear 78 is provided between the rotating body 74A and the rotating body 74B, as shown in FIG. 9. The first bevel gear 78 rotates integrally with the shaft 77. The first bevel gear 78 constitutes a deceleration mechanism 76 (see FIG. 9) that transmits the power to the head movement motor 101 to the shaft 77.

Hereinafter, the deceleration mechanism 76 will be described with reference to FIG. 9.

The deceleration mechanism 76 includes the first bevel gear 78, a second bevel gear 79, a spur gear 80, a spur gear 81, a spur gear 82, a worm wheel 83, and a cylindrical worm 84.

The second bevel gear 79 meshes with the first bevel gear 78. The second bevel gear 79 and spur gear 80 are integrally formed and rotatably supported by an attachment frame 34 (see FIG. 6). The attachment frame 34 is fixed with respect to the guide frame 33 by screws. The head movement motor 101 is fixed to the attachment frame 34 by screws.

The spur gear 80 meshes with the spur gear 81. The spur gear 81 is rotatably provided on the attachment frame 34 (see FIG. 6). The spur gear 82 meshes with the spur gear 81. The spur gear 82 and the worm wheel 83 are integrally formed and rotatably provided on the attachment frame 34 (see FIG. 6). The cylindrical worm 84 meshes with the worm wheel 83 and the worm wheel 83 and the cylindrical worm 84 constitute a worm gear mechanism. The cylindrical worm 84 is provided on an output shaft (not shown) of the head movement motor 101 and, by this, when the head movement motor 101 rotates, the rotation is transmitted to the shaft 77 via the deceleration mechanism 76 and the shaft 77 rotates.

Note that in the present embodiment, a deceleration ratio of the deceleration mechanism 76, specifically, the deceleration ratio of the power transmission from the head movement motor 101 to the shaft 77, is 111. The deceleration ratio is desirably greater than 1, more desirably greater than 10, and still more desirably greater than 100 as in the present embodiment.

Figure 11:
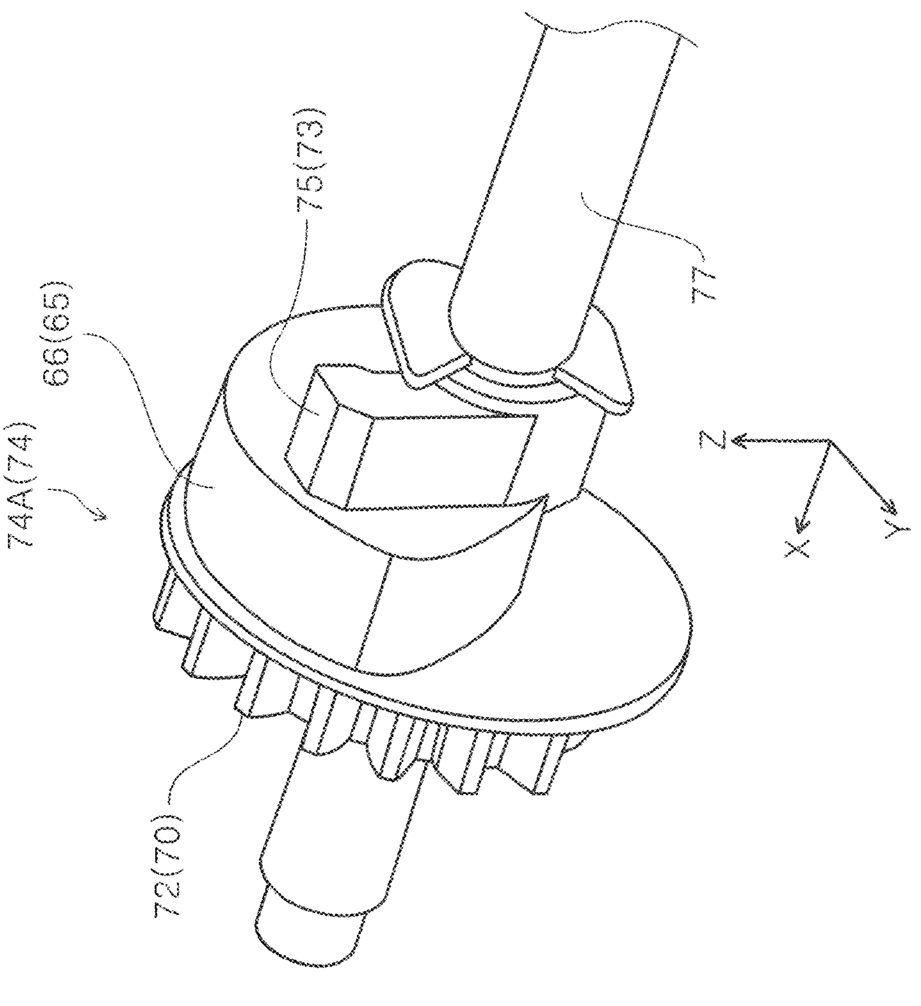
FIG. 11 is a perspective view of the rotating body.

Next, as shown in FIG. 11, the rotating body 74 is provided with the pinion 72 constituting a rack and pinion mechanism. The rotating body 74 is provided with the cam 66. The rotating body 74 is provided with the lever-shaped push-down section 75.

As shown in FIG. 8, FIG. 10, and FIG. 13 to FIG. 18, a rack 71 constituting the rack and pinion mechanism is formed in the rack member 32. The rack 71 meshes with the pinion 72. Therefore, when the pinion 72 rotates, the head unit 30, that is, the line head 40, moves in the Z-axis direction. Specifically, the line head 40 is lowered when the pinion 72 rotates in the rotation direction C1 and the line head 40 is raised when the pinion 72 rotates in the rotation direction C2.

The rack 71 and the pinion 72 constitute a second movement section 70 for moving the line head 40 in the second region Am2.

Note that since the second movement section 70 raises and lowers the line head 40 using the rack and pinion mechanism and, hereinafter, the operation of raising and lowering the line head 40 by the second movement section 70 may be referred to as "rack and pinion drive".

As shown in FIG. 8, FIG. 10, and FIG. 13 to FIG. 18, the rack member 32 is provided with a contact section 32*a* that can contact the cam 66. The contact section 32*a* is provided so as to protrude in the +Y direction and the cam 66 is disposed on the lower side of the contact section 32*a*. The position of the head unit 30, that is, the line head 40, in the Z-axis direction is defined by being supported by the cam 66 via the contact section 32*a* in the first region Am1. In other words, the head unit 30, that is, the line head 40, can be placed on the cam 66 by its own weight. Note that the head unit 30, that is, the line head 40, may be placed on the cam 66 only by its own weight, or may be placed on the cam 66 by receiving a pressing force in a direction including a vertical downward component from a spring or the like. When the head unit 30, that is, the line head 40, receives the pressing force in the direction including the vertical downward component from the spring or the like and is placed on the cam 66, floating of the head unit 30, that is, the line head 40, is suppressed and the platen gap is stabilized.

Figure 12:
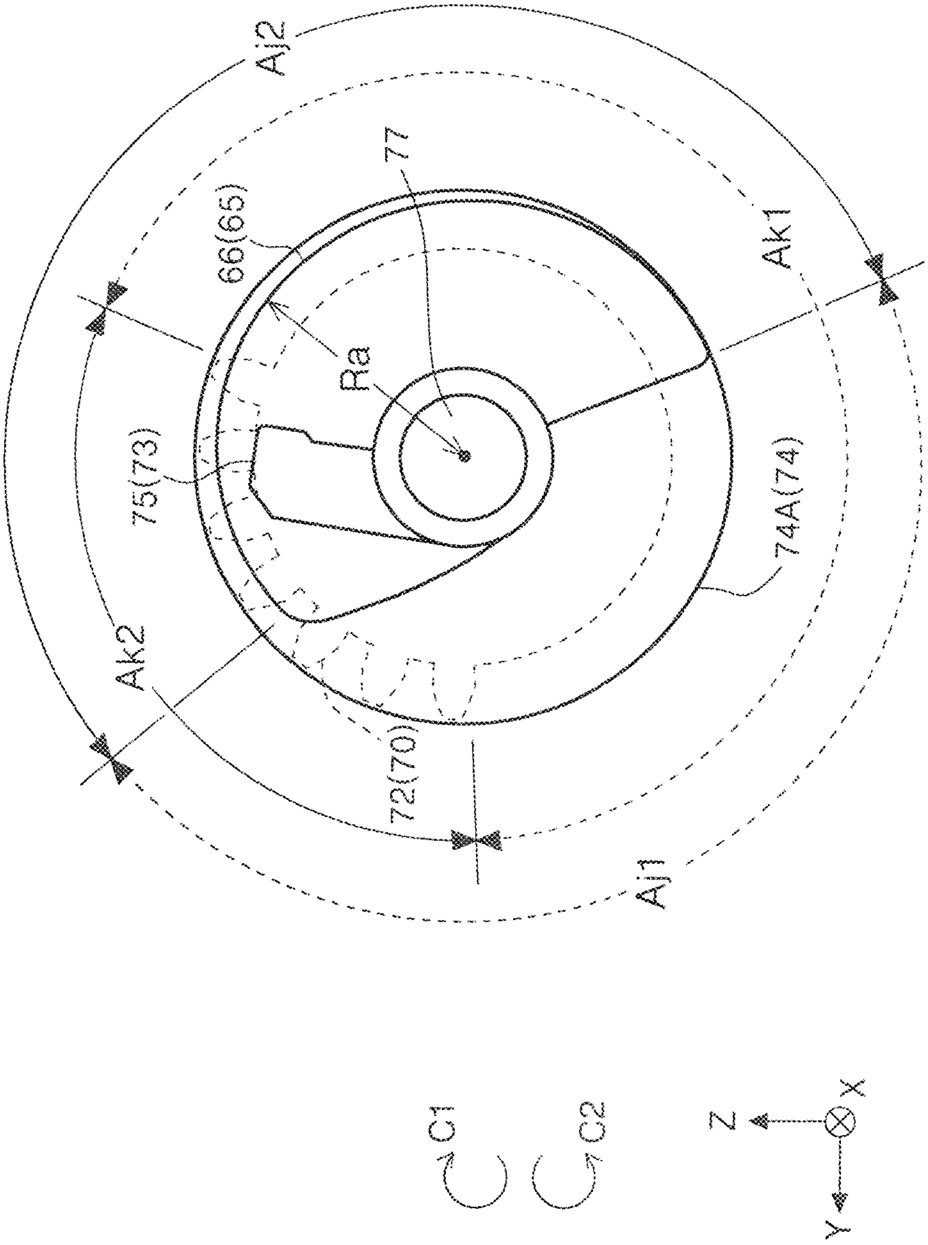
FIG. 12 is a front view of the rotating body.

The outer circumferential surface of the cam 66, the distance, that is, the radius from an axial center of the shaft 77 is formed so as to vary along the circumferential direction (see FIG. 12). Therefore, when the cam 66 rotates in a state in which the contact section 32*a* is placed on the cam 66, the head unit 30, that is, the line head 40, moves in the Z-axis direction. Specifically, when the cam 66 rotates in the rotation direction C1, the line head 40 is lowered and when the cam 66 rotates in the rotation direction C2, the line head 40 is raised.

The cam 66 and the contact section 32*a* constitute a first movement section 65 for moving the line head 40 in the first region Am1.

Note that since the first movement section 65 raises and lowers the line head 40 by the cam 66, hereinafter, the operation of raising and lowering the line head 40 by the first movement section 65 may be referred to as "cam drive".

The first movement section 65 and the second movement section 70 described above constitute a movement unit 110 (see FIG. 4).

As shown in FIG. 10 and FIG. 13 to FIG. 18, the rack member 32 is provided with a pressed section 32*b* that can contact the push-down section 75. The pressed section 32*b* is provided so as to protrude in the +Y direction and the push-down section 75 is configured to be able to contact the pressed section 32*b* from above.

When the rotating body 74 rotates in the rotation direction C1, the push-down section 75 presses the pressed section 32*b* from above and the head unit 30, that is, the line head 40, can be pushed down in the −Z direction, that is, downward. The push-down section 75 and the pressed section 32*b* constitute a third movement section 73 that lowers the line head 40 in the third region Am3. Note that when the line head 40 rises in the third region Am3, the line head 40 is raised by the pressing force of the coil spring 54 (see FIG. 5), which is an example of a pressing member described above. Therefore, the coil spring 54 (see FIG. 5) also constitutes the third movement section 73.

Note that since the third movement section 73 raises and lowers the line head 40 by the lever-shaped push-down section 75, hereinafter, the operation of raising and lowering the line head 40 by the third movement section 73 may be referred to as "lever drive".

In the present embodiment, the third movement section 73 constitutes the movement unit 110 (see FIG. 4).

FIG. 12 shows a formation range of the cam 66 and the pinion 72.

The pinion 72 has a first phase region Ak1 where there are no teeth and a second phase region Ak2 where teeth are formed. Note that in the following, when simply referred to as the "pinion 72", for convenience, it will refer to the second phase region Ak2 where teeth are formed.

The cam 66 has a non-support phase region Aj1 that does not support the contact section 32*a* and a support phase region Aj2 that can support the contact section 32*a*. In the support phase region Aj2, the radius Ra of the outer circumferential surface supporting the contact section 32*a* varies along the circumferential direction. Note that in the following, when simply referred to as "cam 66", for convenience, it will refer to the support phase region Aj2.

Hereinafter, the operations of the first movement section 65, the second movement section 70, and the third movement section 73 will be further described.

Figure 13:
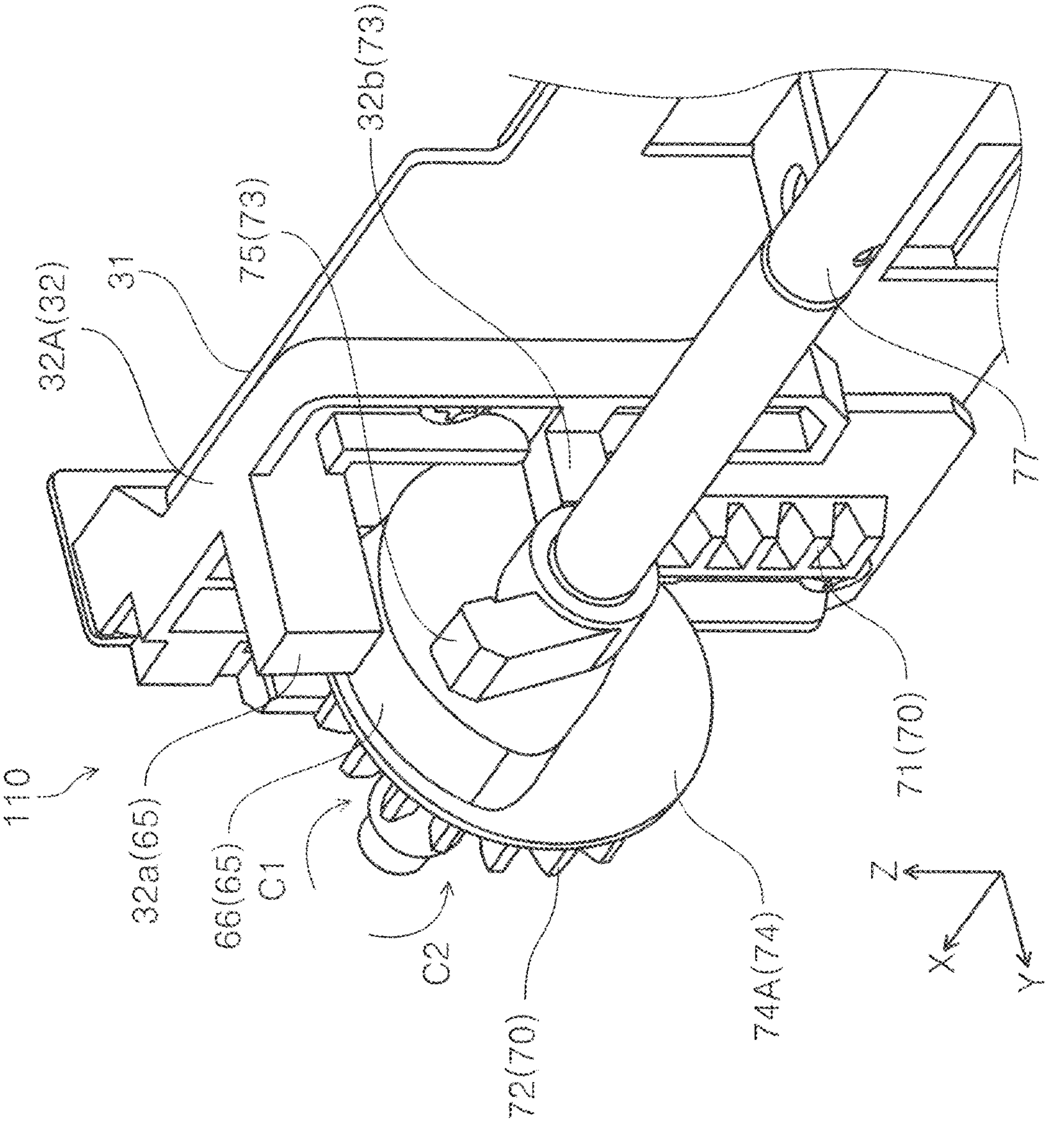
FIG. 13 is a perspective view of the rotating body and a rack member.

FIG. 13 shows a state in which the line head 40 is in the first recording position of the first region Am1. In this state, the first movement section 65 functions. That is, the head unit 30 is in a state in which placed on the cam 66 by use of its own weight. In this state, the rack 71 is not meshed with the pinion 72 and the push-down section 75 is separated from the pressed section 32*b*.

Since it is necessary to accurately set the position of the line head 40 in the first region Am1, that is, the area where recording is performed on the medium, cam drive by the first movement section 65 is adopted.

When the shaft 77 is rotated in the rotation direction C2 from the state shown in FIG. 13, the cam 66 also rotates in the rotation direction C2. In the present embodiment, the outer circumferential surface of the cam 66 is formed such that the radius changes by 0.01 mm when the cam 66 rotates by 1°. That is, when the cam 66 rotates by 1°, the line head 40 raises or lowers by 0.01 mm.

Figure 14:
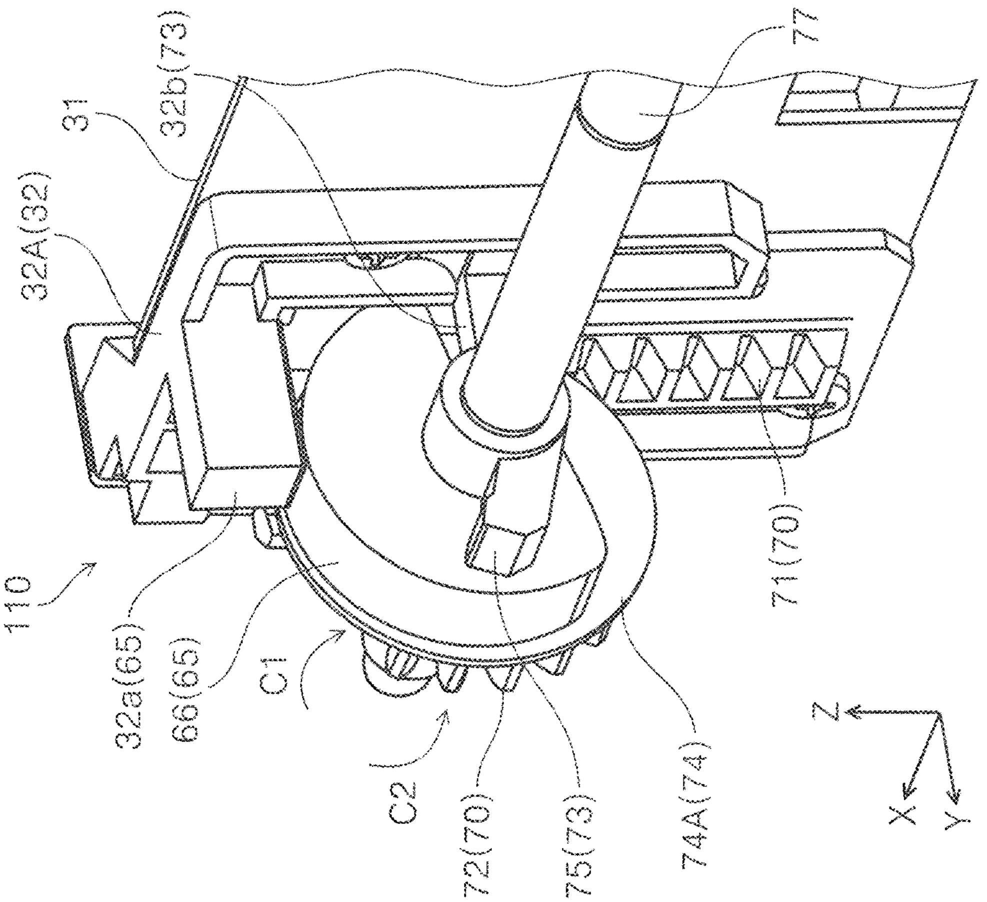
FIG. 14 is a perspective view of the rotating body and the rack member.

FIG. 14 shows a state in which the shaft 77 rotates in the rotation direction C2 from the state of FIG. 13 and the line head 40 moves to the second recording position in the first region Am1.

Figure 15:
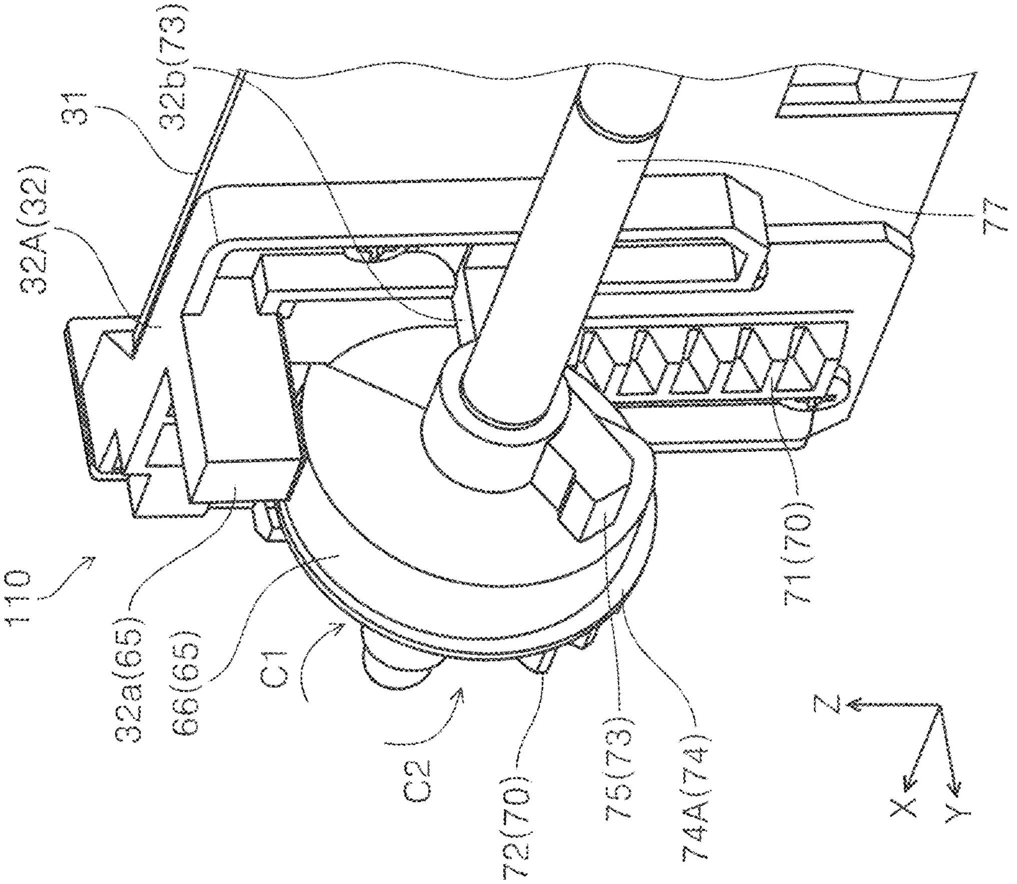
FIG. 15 is a perspective view of the rotating body and the rack member.

FIG. 15 shows a state in which the shaft 77 further rotates in the rotation direction C2 from the state shown in FIG. 14 and the line head 40 moves to the third recording position in the first region Am1.

In this manner, in the first region Am1, since the first movement section 65 has a small movement amount of the line head 40 per unit rotation angle of the shaft 77 functions, it is possible to accurately position the line head 40 at each recording position.

Note that when the line head 40 is lowered from the state of FIG. 15 to be positioned at the second recording position or the first recording position or when the line head 40 is positioned at the capping position Hp0, it rotates the shaft 77 in the rotation direction C1.

Figure 16:
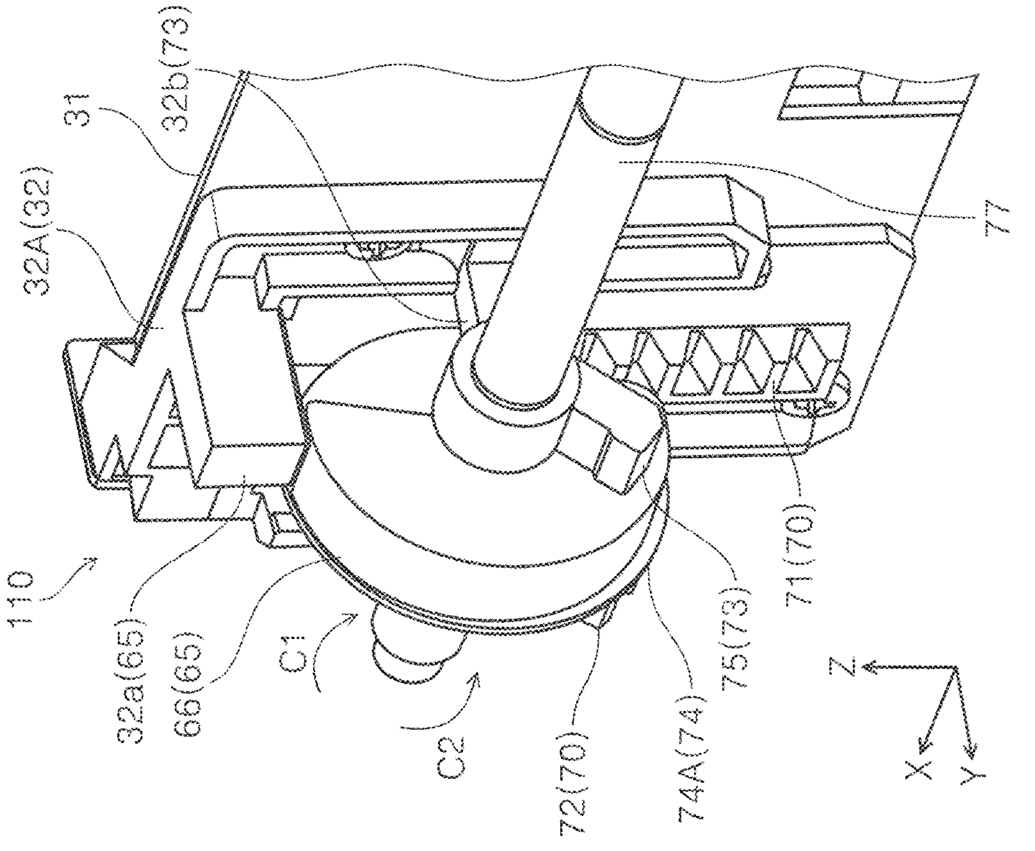
FIG. 16 is a perspective view of the rotating body and the rack member.
Figure 17:
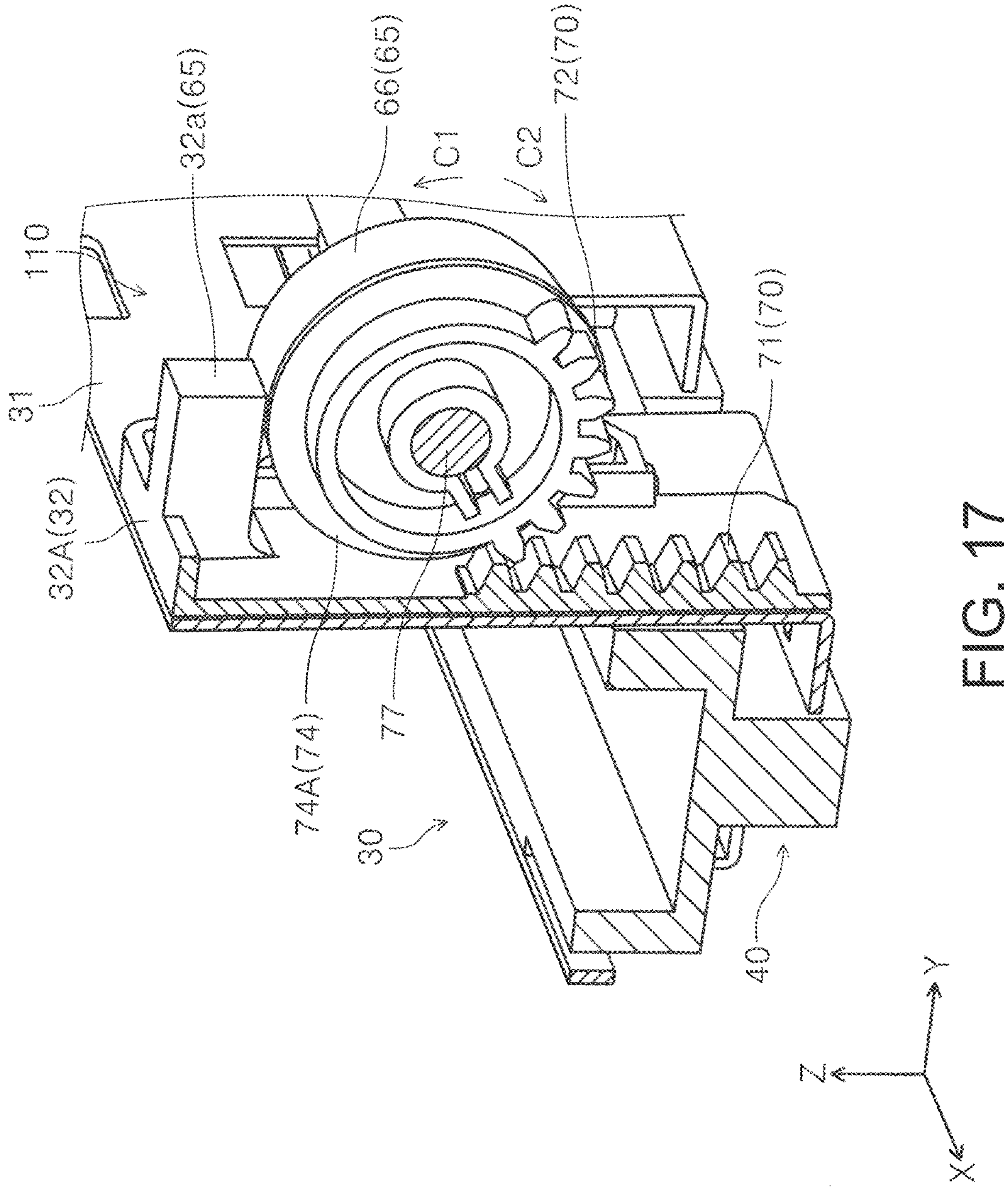
FIG. 17 is a perspective view of the rotating body and the rack member.

Next, FIG. 16 and FIG. 17 shows a state in which the shaft 77 is further rotated in the rotation direction C2 from the state of FIG. 15, and FIG. 16 and FIG. 17 are diagrams showing the same state. The state shown in FIG. 16 and FIG. 17 is a state in which the contact section 32*a* is placed on the portion where the radius Ra of the cam 66 is largest and when the shaft 77 is rotated in the rotation direction C2 further form this state, the contact section 32*a* separates from the cam 66.

In this state, as shown in FIG. 17, the rack 71 is in a state in which it starts engaging the pinion 72.

In this way, when transitioning from the first region Am1 to the second region Am2, the line head 40 transitions from a state of being moved by the first movement section 65 to a state of being moved by the second movement section 70.

Note that when transitioning from the cam drive by the first movement section 65 to the rack and pinion drive by the second movement section 70, as shown in FIG. 16 and FIG. 17, a state is temporarily formed in which the cam 66 is in contact with the contact section 32*a*, that is, with the line head 40, and also the pinion 72 meshes with the rack 71. By this, even when the contact section 32*a* separates from the cam 66, the line head 40 does not move down.

Figure 18:
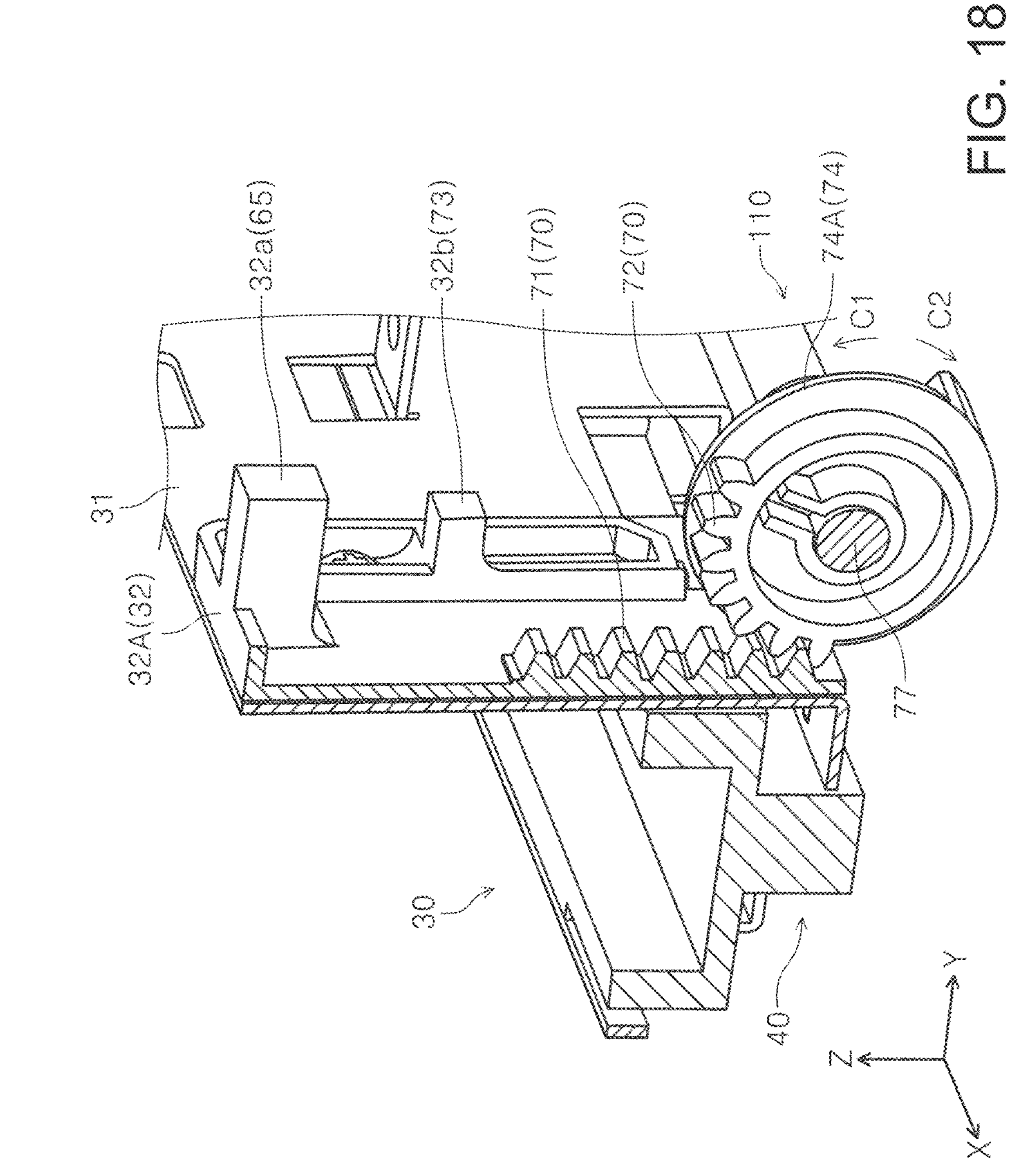
FIG. 18 is a perspective view of the rotating body and the rack member.

FIG. 18 shows a state in which the shaft 77 further rotates in the rotation direction C2 from the state of FIG. 16 and FIG. 17 and the head unit 30 is raised to the most +Z direction position by the second movement section 70, that is, by the rack and pinion mechanism. This state is a state where the line head 40 is most separated from the facing section 45 and is the jam processing position Hp2 in a case where a paper jam occurs.

Note that in the present embodiment, the rack and pinion mechanism of the rack 71 and the pinion 72 is configured such that the line head 40 rises or lowers by about 0.26 mm when the pinion 72 rotates by 1°. Therefore, the movement amount of the line head 40 per unit rotation angle of the shaft 77 is much larger in the second movement section 70 than in the first movement section 65.

Note that in the present embodiment, when the line head 40 is at the jam processing position Hp2, the platen gap is 30 mm to 40 mm.

In the above described process, that is, in the process of raising the line head 40 from the first recording position to the jam processing position, it is only necessary to rotate the shaft 77 in the rotation direction C2 and it is not necessary to switch the rotation direction.

Note that in the movement region of the line head 40, the lowermost position is the capping position Hp0 and the uppermost position is the jam processing position Hp2. Similarly, in the process of raising the line head 40 from the capping position Hp0 to the jam processing position Hp2, it is only necessary to rotate the shaft 77 in the rotation direction C2 and it is not necessary to switch the rotation direction.

Note that when the line head 40 lowers from the jam processing position Hp2, the above operation is reversed. That is, when transitioning from the second region Am2 to the first region Am1, the line head 40 transitions from the rack and pinion drive by the second movement section 70 to the cam drive by the first movement section 65. Specifically, when transitioning from the second region Am2 to the first region Am1, the line head 40 is in a state where the pinion 72 is separated from the rack 71 and the contact section 32*a* is placed on the cam 66.

In the process of lowering the line head 40 from the jam processing position Hp2 to the first recording position, it is only necessary to rotate the shaft 77 in the rotation direction C1 and it is not necessary to switch the rotation direction. Similarly, in the process of lowering the line head 40 from the jam processing position Hp2 to the capping position Hp0, it is only necessary to rotate the shaft 77 in the rotation direction C1 and it is not necessary to switch the rotation direction.

When transitioning from the rack and pinion drive by the second movement section 70 to the cam drive by the first movement section 65, as shown in FIG. 16 and FIG. 17, a state is temporarily formed in which the cam 66 is in contact with the contact section 32*a* and the line head 40 and the pinion 72 meshes with the rack 71. By this, even when the pinion 72 is separated from the rack 71, the line head 40 does not move down.

Next, a case where lowering the line head 40 from the first region Am1, that is, a case where performing the capping operation, will be described. Note that when the capping operation is performed while the shutter 47 (see FIG. 5) of the facing section 45 is in the closed position, then prior to the capping operation, the shutter 47 is moved from the closed position to the open position as described above.

Figure 19:
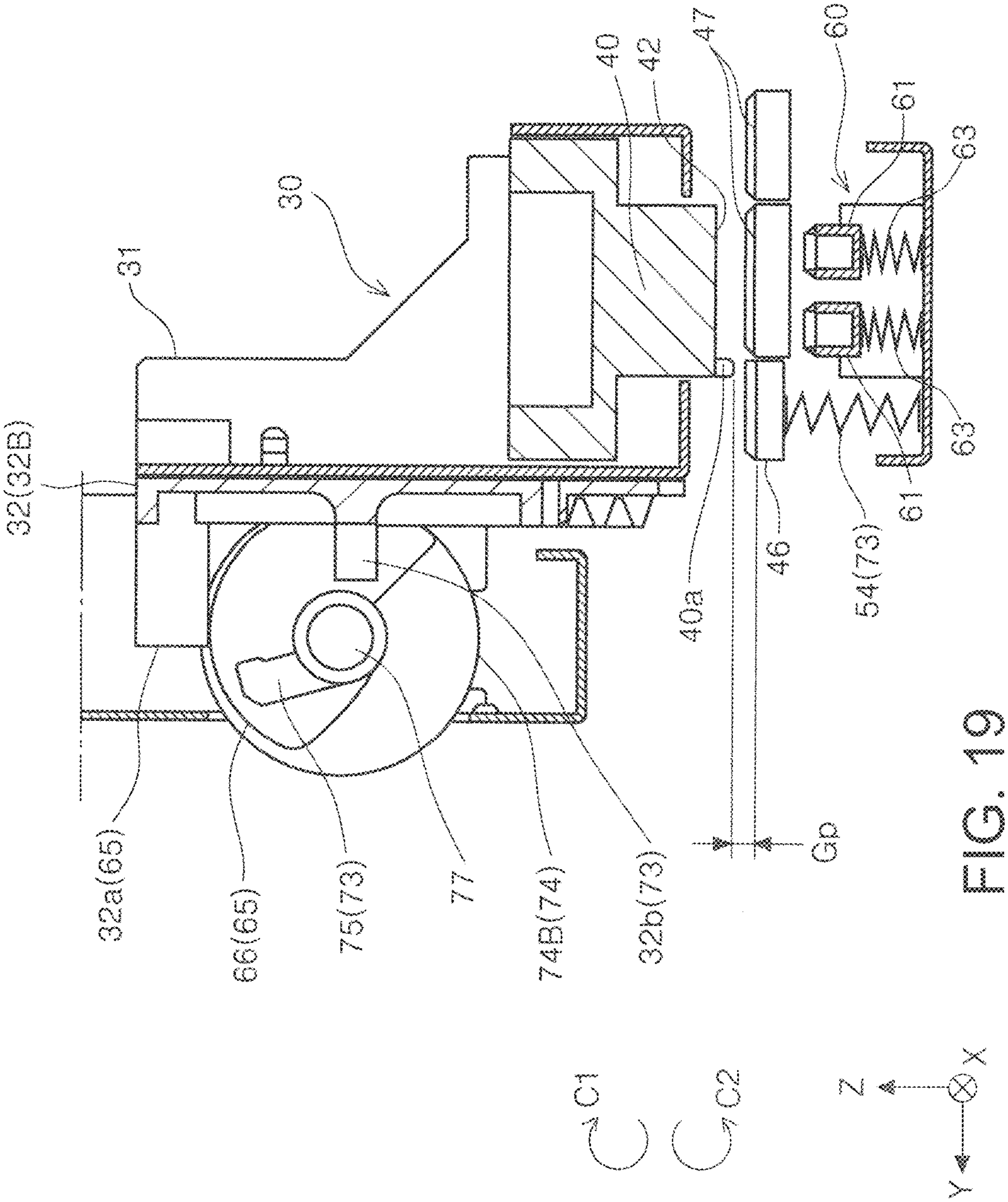
FIG. 19 is a cross-sectional view of the head unit and the cap unit.

FIG. 19 shows a state in which the line head 40 is in a state in the first region Am1, more specifically, is in the first recording position. In the head unit 30, protruding sections 40*a* protruding toward the facing section 45 are provided at positions facing the upstream support section 46. In this state, a gap Gp is formed between the protruding sections 40*a* and the upstream support section 46. Note that although not shown, the protruding sections 40*a* are provided at a position deviated from the medium transport region in the X-axis direction. The protruding sections 40*a* are provided on both sides of the medium transport region in the X-axis direction. The protruding sections 40*a* are provided, for example, on the unit frame 31.

When the capping operation is to be performed from this state, the shaft 77 is rotated in the rotation direction C1. By this, since the radius Ra of the cam 66 at the position where the contact section 32*a* is in contact with the outer circumferential surface of the cam 66 decreases, the line head 40 is lowered.

Figure 20:
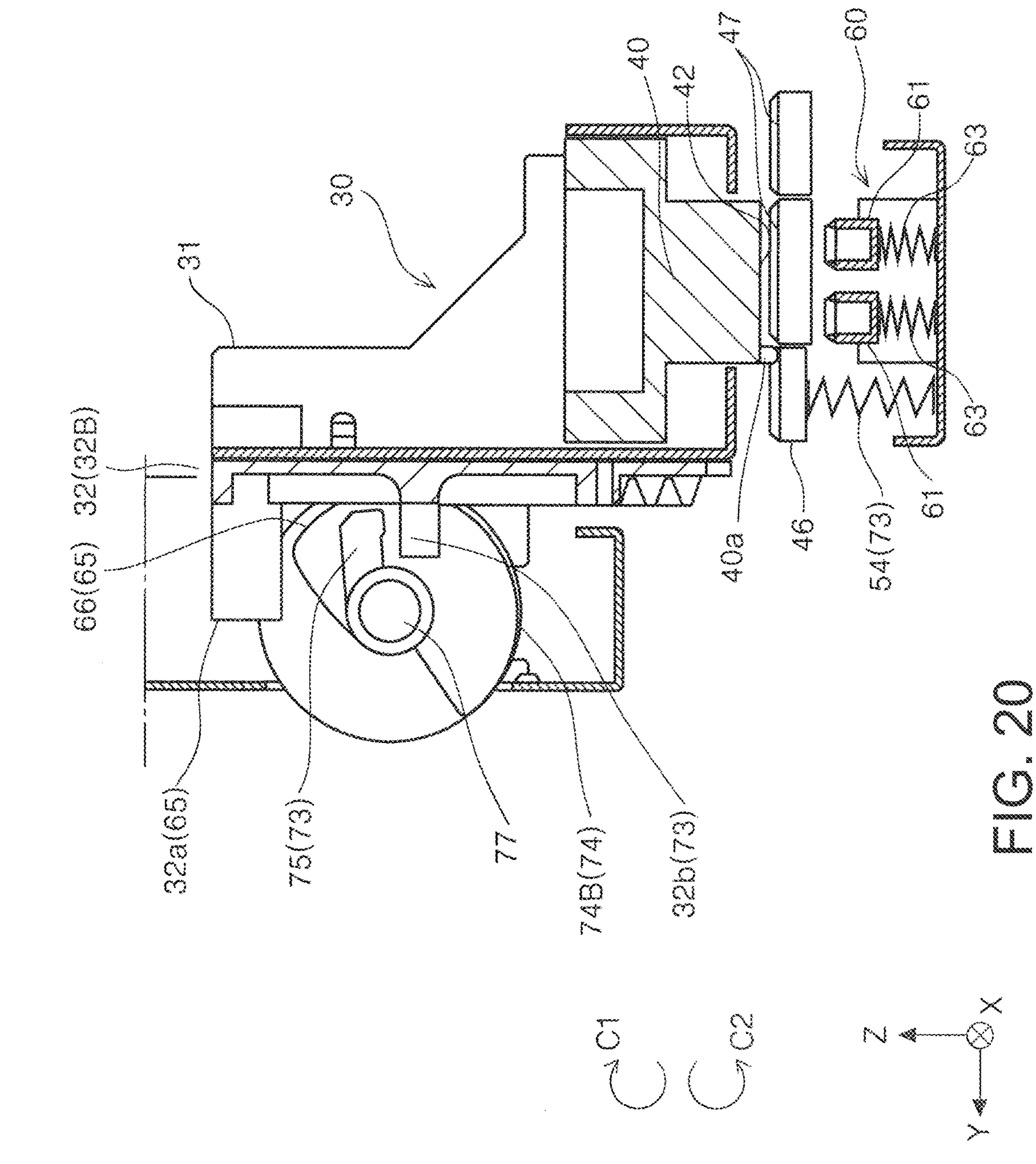
FIG. 20 is a cross-sectional view of the head unit and the cap unit.

When the line head 40 is lowered, the protruding sections 40*a* come into contact with the upstream support section 46 as shown in FIG. 20 and the lowering of the line head 40 is stopped. This state is a state in which the head unit 30 is placed on the upstream support section 46, that is, the facing section 45, by its use of own weight. The pressing force of the coil spring 54 for pressing the upstream support section 46 upward is set to such a magnitude that the upstream support section 46 is not displaced downward when the head unit 30 is placed on the upstream support section 46 by use of its own weight.

Note that the line head 40 being placed on the facing section 45 by use of its own weight is not limited to a form in which the line head 40 is placed on the facing section 45 only by its own weight, but also includes a form in which the line head 40 is placed on the facing section 45 by receiving a pressing force in a direction including a vertically downward component from a spring or the like in addition to its own weight. When the head unit 30, that is, the line head 40, receives the pressing force in a direction including a vertically downward component from a spring or the like and is placed on the facing section 45, floating of the head unit 30, that is, the line head 40, is suppressed and the platen gap is stabilized.

Note that since the push-down section 75 is not in contact with the pressed section 32*b* at the time when the protruding sections 40*a* are in contact with the upstream support section 46, even when the shaft 77, that is, the rotating body 74, rotates in the rotation direction C1, a period in which the line head 40 maintains a stopped state is generated. This period is an idle rotation period (to be described in detail later) of the head movement motor 101.

When the shaft 77 further rotates in the rotation direction C1 from the state of FIG. 20, the push-down section 75 comes into contact with the pressed section 32*b* and pushes down the pressed section 32*b*. That is, the lever drive by the third movement section 73 is started and, by this, the head unit 30, that is, the line head 40, is lowered. At this time, the head unit 30 pushes down the upstream support section 46 downward against the pressing force of the coil spring 54.

Figure 21:
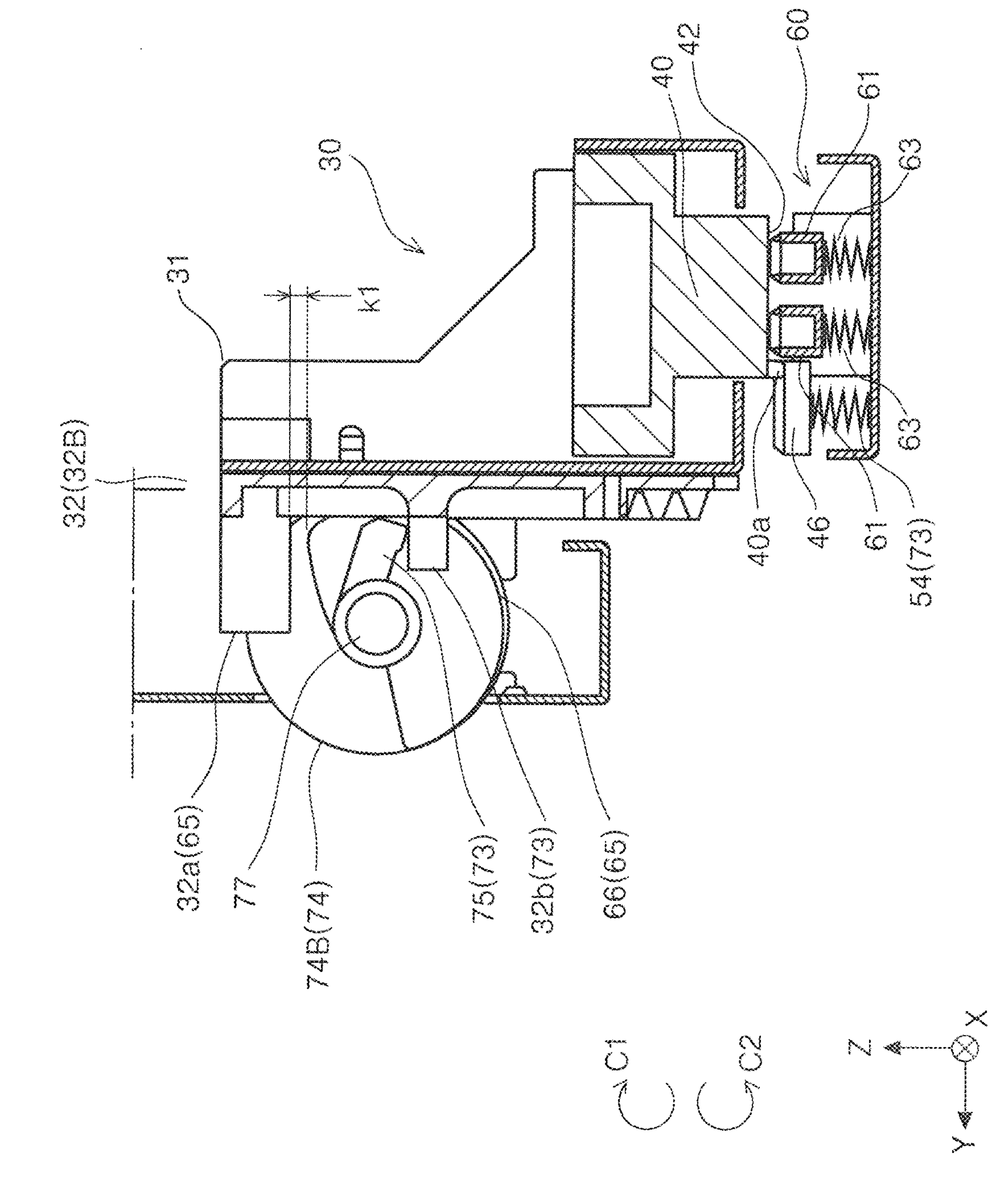
FIG. 21 is a cross-sectional view of the head unit and the cap unit.

FIG. 21 shows a state in which the line head 40 is in a state in the capping position Hp0. In a process in which the line head 40 moves to the capping position Hp0, the head surface 42*a* of the line head 40 comes into contact with the cap sections 61 and the head surface 42*a* pushes down the cap section 61 by a predetermined amount against the pressing force of the cap springs 63. By this, the cap sections 61 are brought into close contact with the head surface 42*a*.

In a case where the head unit 30, that is, the line head 40, is to be raised from the state of FIG. 21, the shaft 77 is rotated in the rotation direction C2. By this, since the push-down section 75 is displaced upward, the line head 40 is raised by spring force of the coil spring 54 while the position of the line head 40 in the Z-axis direction is restricted by the push-down section 75, and returns to the state shown in FIG. 20.

When the shaft 77 is further rotated in the rotation direction C2 from the state of FIG. 20, it switches to cam drive by the first movement section 65.

In FIG. 21, reference symbol k1 denotes a clearance formed between the cam 66 and the contact section 32*a*. When there is no clearance k1, a state in which the line head 40 is supported by the cam 66 and a state in which the push-down section 75 pushes down the pressed section 32*b*, that is, the line head 40, is simultaneously formed, and there is a concern that the rotating body 74 is in a locked state and cannot rotate.

However, since the clearance k1 is provided, a state in which the line head 40 is supported by the cam 66 and a state in which the push-down section 75 pushes down the line head 40 are not formed simultaneously, and locking of the rotating body 74 can be avoided.

In the present embodiment, as described above, the line head 40 includes the rack member 32 in which the pressed section 32*b*, the contact section 32*a*, and the rack 71 are integrally formed. By this, the relative positional relationship of the pressed section 32*b*, the contact section 32*a*, and the rack 71 can be easily determined. As a result, it is possible to reliably realize a configuration in which a state in which the line head 40 is supported by the cam 66 and a state in which the push-down section 75 pushes down the line head 40 are not formed simultaneously.

Note that even when the cam 66 is separated from the contact section 32*a* and forms the clearance k1, the line head 40 is not lowered because the line head 40 is supported by the upstream support section 46. However, instead of the configuration in which the upstream support section 46 supports the line head 40 in a state where the cam 66 is separated from the contact section 32*a* and the clearance k1 is formed, a configuration in which the cap sections 61 support the line head 40 may be adopted.

As described above, the printer 1 includes the medium transport path Ta for transporting the medium, the line head 40 movable relative to the medium transport path Ta in a direction that intersects the recording surface of the medium, and the movement unit 110 for moving the line head 40.

The movement region of the line head 40 has the first region Am1 and the second region Am2, which is farther from the medium transport path Ta than the first region Am1.

The movement unit 110 includes the first movement section 65, which moves the line head 40 in the first region Am1, and a second movement section 70, which moves the line head 40 in the second region Am2.

When transitioning from the first region Am1 to the second region Am2, the line head 40 transitions from a state of being moved by the first movement section 65 to a state of being moved by the second movement section 70. When transitioning from the second region Am2 to the first region Am1, the line head 40 transitions from a state of being moved by the second movement section 70 to a state of being moved by the first movement section 65.

The first movement section 65 and the second movement section 70 are driven by the head movement motor 101 which is a common drive source. By this, a cost increase of the device can be suppressed and miniaturization of the device can be achieved, as compared with the configuration of the first movement section 65 and the second movement section 70*a* are driven by separate drive sources.

When transitioning from the first region Am1 to the third region Am3, the line head 40 transitions from a state of being moved by the first movement section 65 to a state of being moved by the third movement section 73. When transitioning from the third region Am3 to the first region Am1, the line head 40 transitions from a state of being moved by the third movement section 73 to a state of being moved by the first movement section 65.

That is, in the present embodiment, in addition to the first movement section 65 and the second movement section 70, the third movement section 73 is driven by one head movement motor 101. As a result, cost increases of the device can be suppressed and miniaturization of the device can be achieved.

In the present embodiment, the first movement section 65 includes the cam 66, which is a cam that rotates by the power of the head movement motor 101 and that moves the line head 40 by being rotated in a state of supporting the line head 40. By this, the position of the line head 40 can be finely adjusted at a position close to the medium transport path Ta. As a result, the line head 40 can be positioned at an appropriate position in accordance with the thickness of the medium.

In the present embodiment, the second movement section 70 includes the rack 71 that is provided in the line head 40 and the pinion 72 that is the pinion 72 meshed with the rack 71 and that moves the line head 40 by being rotated by the power of the head movement motor 101. By this, even when a large second region Am2 is secured, the line head 40 can be greatly moved accordingly, which contributes to the convenience of the maintenance work and the like.

However, the first movement section 65 is not limited to cam drive, and other configurations, such as a rack and pinion drive, may be adopted. The second movement section 70 is not limited to rack and pinion drive, and other configurations, such as cam drive, may be adopted.

In the present embodiment, the cam 66 and the pinion 72 are integrally formed to constitute the rotating body 74. By this, it is possible to easily transmit power from the head movement motor 101 to the first movement section 65 and the second movement section 70. Since it is not necessary to individually transmit power from the head movement motor 101 to the first movement section 65 and the second movement section 70, it is possible to reduce the number of parts. As a result, cost increases of the device can be suppressed and miniaturization of the device can be achieved. However, the cam 66 and the pinion 72 may be formed separately.

Further, in the present embodiment, the rotating body 74 is provided with the push-down section 75. By this, it is possible to easily transmit power from the head movement motor 101 to the first movement section 65, the second movement section 70, and the third movement section 73. Since it is not necessary to individually transmit the power from the head movement motor 101 to the first movement section 65, the second movement section 70, and the third movement section 73, it is possible to reduce the number of parts. As a result, cost increases of the device can be suppressed and miniaturization of the device can be achieved.

However, the push-down section 75 may be configured separately from the rotating body 74.

In the present embodiment, the pinion 72 has the first phase region Ak1 in which there are no teeth and the cam 66 supports the line head 40 when the first phase region Ak1 faces the rack 71. By this, the following operational effects can be obtained.

That is, when the first movement section 65 moves the line head 40, when the second movement section 70 tries to move the line head 40, there is a concern that there may be a divergence in positional adjustment of the line head 40 by the first movement section 65. According to the present aspect, since the pinion 72 has the first phase region Ak1 where there are no teeth and the cam 66 supports the line head 40 when the first phase region Ak1 faces the rack 71, it is possible to suppress the second movement section 70 from causing an adverse effect when the first movement section 65 moves the line head 40.

In the present embodiment, when transitioning from the movement of the line head 40 by the cam 66 to the movement of the line head 40 by the pinion 72 and when transitioning from the movement of the line head 40 by the pinion 72 to the movement of the line head 40 by the cam 66, a state in which the cam 66 is in contact with the line head 40 and the pinion 72 meshes with the rack 71 is temporarily formed. By this, a state in which the line head 40 is not supported by either the cam 66 or the pinion 72 does not occur. As a result, it is possible to avoid the line head 40 from failing due to impact from the line head 40 falling. Note that the state in which the cam 66 is in contact with the line head 40 and the pinion 72 meshes with the rack 71 is excluded from the states of the first recording position, the second recording position, and the third recording position described above.

When the cam 66 and the pinion 72 are configured separately, there is a concern that, due to parts tolerances, assembly errors, or the like, it could not temporarily form a state in which the cam 66 contacts the line head 40 and the pinion 72 meshes with the rack 71. However, in the present embodiment, since the cam 66 and the pinion 72 are integrally formed, it is possible to suppress the occurrence of such a failure as described above.

In the present embodiment, the line head 40 includes the rack member 32 in which the contact section **32*a*, which is in contact with the cam 66, and the rack 71 are integrally formed. By this, the positional relationship between the contact section 32*a* and the rack 71** can be easily determined.

Here, if the contact section **32*a* and the rack 71 were configured separately, there is a concern that, due to parts tolerances, assembly errors, or the like, it could not temporarily form a state in which the cam 66 contacts the line head 40 and the pinion 72 meshes with the rack 71. However, since the contact section 32*a* and the rack 71 are integrally formed and the positional relationship between the contact section 32*a* and the rack 71** is easily determined, it is possible to suppress the occurrence of such a failure as described above.

In the present embodiment, the printer 1 is provided with the guide frame 33, which guides the line head 40 in the Z-axis direction, that is, in the movement direction of the line head 40, and a shaft 77, which is a rotation shaft of the rotating body 74, and the shaft 77 is rotatably supported by the guide frame 33. By this, the positional relationship between the rotating body 74 and the rack member 32 is easily determined, the positional relationship between the rack 71 and the pinion 72 is appropriately determined, and the positional relationship between the contact section **32*a* and the cam 66 is also appropriately determined. Therefore, the line head 40 can be appropriately moved by the first movement section 65 and the second movement section 70**.

In the present embodiment, the head unit 30 includes the plurality of nozzles 44 that eject ink, which is an example of a liquid, along the medium width direction and includes a line head 40, which is a liquid ejection head that ejects ink from the nozzles 44 without moving in the medium width direction. The position facing the line head 40 is provided with the cap sections 61 for covering the head surface **42*a*, which is the liquid ejection surface of the line head 40**.

The cap sections 61 are displaceable in a direction of advancing and retreating with respect to the line head 40 and the cap sections 61 are pressed toward the line head 40 by the cap springs 63, which is an example of a pressing member.

The line head 40 is further movable from the first region Am1 toward the capping position Hp0, where the head surface 42*a* is covered with the cap sections 61.

The rotating body 74 is provided with the push-down section 75 that, with respect to the line head 40, pushes down the line head 40 toward the cap sections 61 with rotation of the rotating body 74 after contact between the contact section 32*a*, which is for contacting the cam 66, and the cam 66 is released. By this, the following operational effects can be obtained.

In order to reliably cover the head surface 42*a* of the line head 40 with the cap section 61, it is necessary to press the head surface 42*a* against the cap section 61, counteracting the pressing force of the cap spring 63." The first movement section 65 is for moving the line head 40 in the first region Am1 and also for moving the line head 40 by the rotation of the cam 66, and cannot press the head surface 42*a* onto the cap sections 61.

However, the rotating body 74 is provided with the push-down section 75 that, with respect to the line head 40, pushes the line head 40 down toward the cap sections 61 with the rotation of the rotating body 74 after contact between the contact section 32*a*, which is for contacting the cam 66, and the cam 66 is released. By this, the head surface 42*a* can be reliably pressed against the cap sections 61 and the head surface 42*a* can be reliably covered by the cap sections 61.

By the push-down section 75 being provided on the rotating body 74, a separate power source for reliably pressing the head surface 42*a* onto the cap sections 61 is not required. As a result, cost increases of the device can be suppressed and miniaturization of the device can be achieved.

Position Detection of Line Head

Next, the position detection in the movement direction of the line head 40 will be described. Hereinafter, when simply referred to as the movement direction, it means the movement direction of the line head 40 (Z-axis direction).

First, the control section 100 will be further described with reference to FIG. 4. Note that the control section 100 controls the entire printer 1, but a configuration that is not related to the movement of the line head 40 is not shown in FIG. 4.

The control section 100 performs various kinds of control including recording control of the printer 1. The control section 100 includes one or more processors that operate in accordance with a computer program, in other words, software. The processor includes a CPU and memory, such as RAM and ROM, and the memory stores program code or instructions configured to cause the CPU to perform processes. The control section 100 is not limited to that which performs software processes. For example, the control section 100 may include a dedicated hardware circuit, such as an Application Specific Integrated Circuit (ASIC), that performs hardware processes for at least a part of the processes executed by itself.

The control section 100, as an output system, is electrically connected to the head movement motor 101. In the present embodiment, the head movement motor 101 is a DC motor and is Pulse Width Modulation (PWM) controlled by the control section 100.

The control section 100, as an input system, an operation section 115, the rotary ENC 103, and the linear ENC 107 are electrically connected. The operation section 115 is a portion that receives power being turned on or off, various settings, and recording execution of the printer 1, and can be configured by, for example, a touch panel in which a user interface is realized by control by the control section 100.

The control section 100 includes a calculation section 120, a motor control section 121, a motor driver 122, a volatile memory 123, and a nonvolatile memory 124, which is an example of a storage unit.

The calculation section 120 performs various calculations necessary for operating the printer 1. For example, the calculation section 120 calculates various setting values or the like necessary for executing a program 125 stored in the nonvolatile memory 124. The volatile memory 123 is used as a temporary data storage area.

The motor control section 121 controls the head movement motor 101 via the motor driver 122 by outputting a current command value, for example, a duty signal necessary for Pulse Width Modulation (PWM) control, to the motor driver 122. The motor driver 122 includes a D/A converter and controls the current supplied to the head movement motor 101 by performing PWM control based on the duty signal.

In the present embodiment, the motor control section 121 performs PID control on the head movement motor 101. The motor control section 121 calculates a target rotation speed by multiplying, by a gain Kp, the positional deviation between the target rotation position of the head movement motor 101 and the actual rotation position obtained from the output signal of the rotary ENC 103. Then, the motor control section 121 calculates, based on the speed deviation between this target rotation speed and the actual rotation speed obtained from the output of the rotary ENC 103, the proportional component, integral component, and differential component using the proportional element, integral element, and differential element and sends, based on the sum of these calculation results, a duty signal to the motor driver 122 based on the sum of these calculation results.

Note that the motor control section 121 may control the head movement motor 101 based on an output signal of a linear ENC instead of the output signal of the rotary ENC 103.

The calculation section 120 detects the edge of the output pulse of the rotary ENC 103, counts the number thereof, and calculates the rotation position of the head movement motor 101 based on the count value. The calculation section 120 distinguishes between the forward rotation and the reverse rotation of the head movement motor 101 from the comparison process of the two pulse signals output from the rotary ENC 103. When one edge is detected, the calculation section 120 performs a counting process so as to increment and decrement the rotation position of the head movement motor 101 according to the forward rotation and the reverse rotation.

Figure 22:
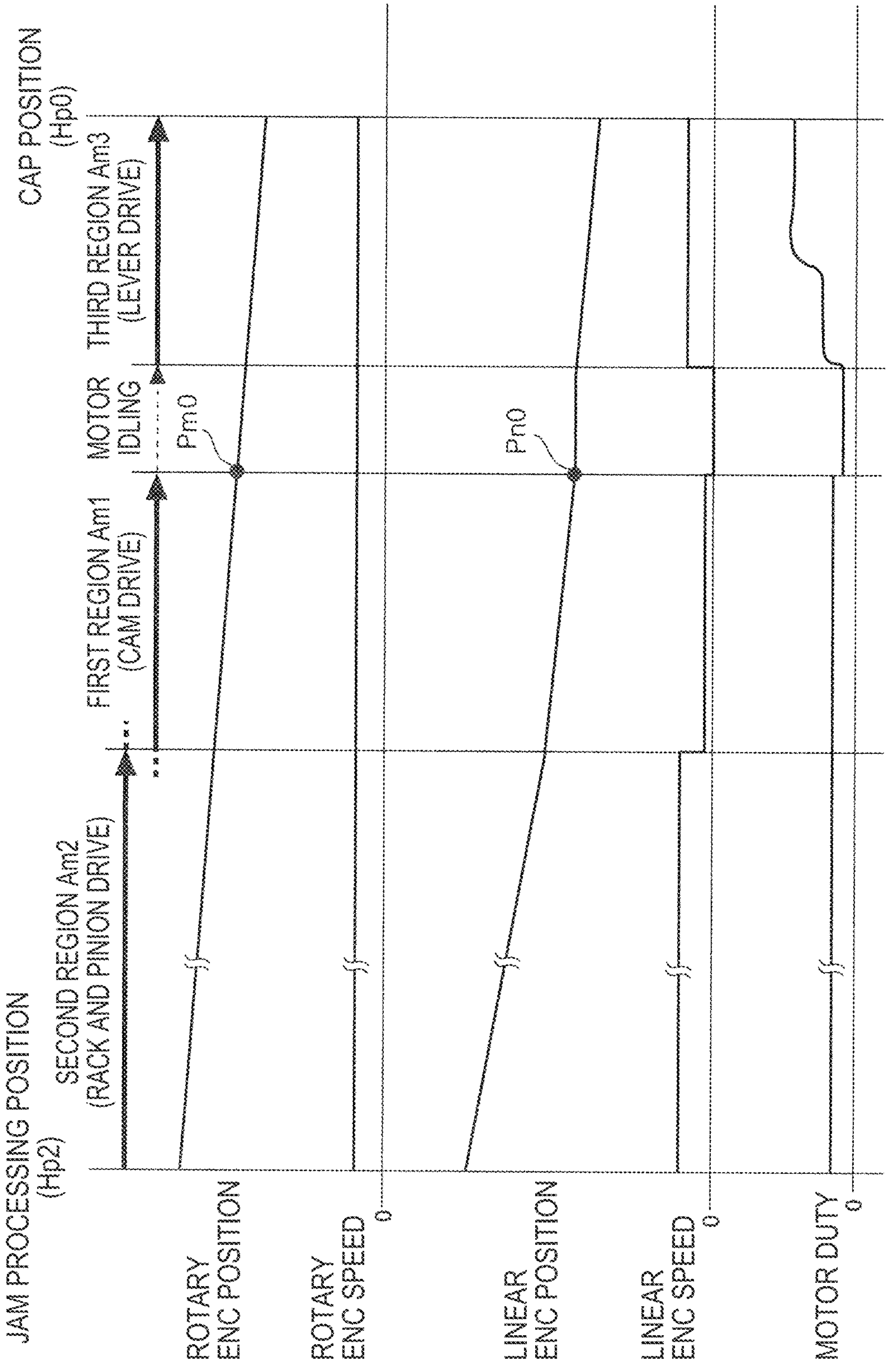
FIG. 22 is a chart of a rotary ENC position, a rotary ENC speed, a linear ENC position, a linear ENC speed, and a motor duty when lowering the line head.
Figure 23:
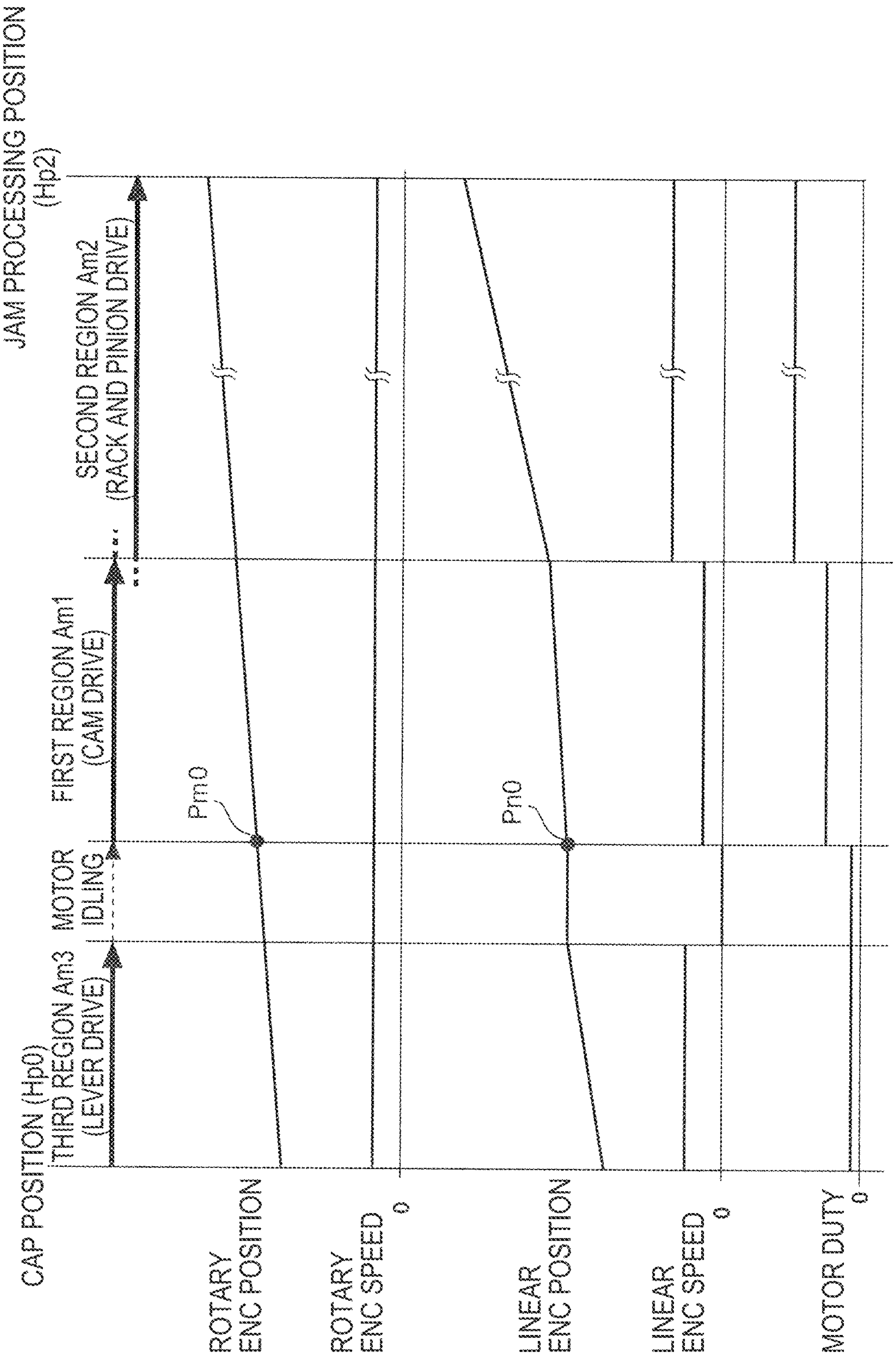
FIG. 23 is a chart of the rotary ENC position, the rotary ENC speed, the linear ENC position, the linear ENC speed, and the motor duty when raising the line head.

With respect to "ROTARY ENC POSITION" shown in FIG. 22 and FIG. 23, the vertical axis is the rotation position of the head movement motor 101 obtained by the above counting process, the upward direction is an increment direction, that is, the direction in which the line head 40 is raised, and the downward direction is a decrement direction, that is, the direction in which the line head 40 is lowered.

Note that the rotary ENC 103 outputs two pulse signals of a pulse ENC-A and a pulse ENC-B. The phases of the pulse ENC-A and the pulse ENC-B are shifted from each other by 90° in both cases of the forward rotation and the reverse rotation of the head movement motor 101. When the head movement motor 101 is rotates forward, the pulse ENC-A leads the pulse ENC-B in phase by 90°. On the other hand, when the head movement motor 101 rotates in reverse, the pulse ENC-A delays the pulse ENC-B in phase by 90°. The time of one cycle of each pulse is equal to the time for which the head movement motor 101 rotates by the interval of the slit of the rotary scale 104. By this, the calculation section 120 can detect the rotation speed of the head movement motor 101. "ROTARY ENC SPEED" shown in FIG. 22 and FIG. 23 corresponds to the rotation speed.

Note that the calculation section 120 can calculate the movement amount of the line head 40 based on the rotation amount of the head movement motor 101 and the deceleration ratio of the deceleration mechanism 76 described above. If the calculation section 120 detects the time of one cycle of each pulse, it is possible to calculate the movement speed of the line head 40 based on the deceleration ratio of the deceleration mechanism 76 described above. However, when no signal change of the linear ENC 107 is detected, that is, when the linear ENC position (to be described later) does not change, the line head 40 is not moving even though the position of the rotary ENC 103 changes.

The calculation section 120 can also detect the edge of the output pulse of the linear ENC 107, count the number thereof, and calculate the position of the line head 40 in the movement direction based on the count value. The calculation section 120 distinguishes between raising and lowering of the line head 40 from the comparison process of the two pulse signals output from the linear ENC 107. When one edge is detected, the calculation section 120 performs a counting process so as to increment and decrement the position of the line head 40 according to the raising and lowering.

With respect to "LINEAR ENC POSITION" shown in FIG. 22 and FIG. 23, the vertical axis is the position obtained by the counting process and corresponds to the position in the movement direction of the line head 40. In the linear ENC position, the upward direction is the increment direction, that is, the direction in which the line head 40 is raised, and the downward direction is the decrement direction, that is, the direction in which the line head 40 is lowered.

Note that the linear ENC 107 outputs two pulse signals of a pulse ENC-A and a pulse ENC-B. The phase of the pulse ENC-A and the pulse ENC-B are shifted from each other by 90° in both cases of the rising and the lowering of the line head 40. When the line head 40 is ascending, the pulse ENC-A leads the pulse ENC-B in phase by 90°. On the other hand, when the line head 40 is lowering, the pulse ENC-A is delayed from the pulse ENC-B in phase by 90°. The time of one cycle of each pulse is equal to the time for which the line head 40 moves by the interval of the slits of the linear scale 108.

If the calculation section 120 counts the number of pulse signals, it is possible to detect the movement amount of the line head 40. If the calculation section 120 detects the time of one cycle of each pulse, it is possible to calculate the movement speed of the line head 40. "LINEAR ENC SPEED" shown in FIG. 22 and FIG. 23 corresponds to the movement speed.

Hereinafter, an outline of an origin detection method of the line head 40 will be described.

As an example, when the line head 40 lowers from the recording position Hp1 shown in FIG. 19, both the rotary ENC 103 and the linear ENC 107 produce signal change until the protruding sections 40*a* provided on the line head 40 contact the upstream support section 46. This appears in the rotary ENC position and the linear ENC position during the cam drive period shown in FIG. 22.

When the protruding sections 40*a* provided on the line head 40 contact the upstream support section 46, the lowering of the line head 40 is temporarily stopped, so that the signal from the linear ENC 107 stops changing. This appears in the linear ENC position during the motor idling period shown in FIG. 22. However, since the head movement motor 101 continuously rotates, the signal change of the rotary ENC 103 occurs continuously as indicated by the rotary ENC position during the motor idling period shown in FIG. 22.

The control section 100 can set the origin position of the line head 40 by using this property. That is, in a state where signal change of the rotary ENC 103 exists while the line head 40 is being lowered toward the facing section 45, the control section 100 sets the origin position of the line head 40 based on the position of the line head 40 when the signal of the linear ENC 107 stops changing.

In FIG. 22, the position Pm0 is the rotary ENC position at the time when the signal of the linear ENC 107 stops changing, that is, the origin position of the rotary ENC 103, and the position Pn0 is the linear ENC position at the time when the signal of the linear ENC 107 stops changing, that is, the origin position of the linear ENC 107.

The position of the line head 40 in the movement direction may be grasped based on the origin position of the rotary ENC 103 or may be grasped based on the origin position of the linear ENC 107. In any case, the distance from the origin position to the boundary of each region can be stored in the nonvolatile memory 124 as a known value. As a result, the control section 100 can grasp the current position of the line head 40.

Note that in the present embodiment, by the deceleration mechanism 76, the encoder resolution with respect to the unit movement amount of the line head 40 is higher in the rotary ENC 103 than in the linear ENC 107. Therefore, in order to secure accuracy in the stop position of the line head 40, the basic speed control of the head movement motor 101 is desirably performed based on the output signal of the rotary ENC 103.

Note that even in a case where the line head 40 is raised, the origin position of the line head 40 can be set. For example, when the line head 40 rises from the capping position Hp0, both the rotary ENC 103 and the linear ENC 107 generate signal change until the upstream support section 46 is raised to the upper limit position. This appears in the rotary ENC position and the linear ENC position during the lever drive period shown in FIG. 23.

When the upstream support section 46 is raised to the upper limit position and the push-down section 75 is separated upward from the pressed section 32*b*, the rise of the line head 40 is temporarily stopped, so that the signal of the linear ENC 107 stops changing. This appears in the linear ENC position during the motor idling period shown in FIG. 23. However, since the head movement motor 101 continuously rotates, the signal change of the rotary ENC 103 continuously occurs as indicated by the rotary ENC position during the motor idling period shown in FIG. 23. When the cam 66 comes into contact with the contact section 32*a* and lifts the line head 40, the protruding sections 40*a* separate from the upstream support section 46 and the line head 40 is raised. This appears in the linear ENC position at the time of transition from the motor idling period to the cam drive period shown in FIG. 23.

The control section 100 can set the origin position of the line head 40 by using this property. That is, the control section 100 sets the origin position of the line head 40 based on the position of the line head 40 when the signal change of the linear ENC 107 is generated in a state in which signal change of the rotary ENC 103 exists.

In FIG. 23, the position Pm0 is the rotary ENC position at the time when the signal of the linear ENC 107 stops changing, that is, the origin position of the rotary ENC 103, and the position Pn0 is the linear ENC position at the time when the signal of the linear ENC 107 stops changing, that is, the origin position of the linear ENC 107.

Hereinafter, the process executed by the control section 100 will be further described with reference to FIG. 24.

The control section 100 performs the above described origin position setting of the line head 40 at a predetermined timing (step S101). The origin position setting can be performed when the power of the printer 1 is turned on, when the elapsed time from the previous origin position setting exceeds a predetermined time, or the like.

Next, the control section 100 sets the rotary ENC position as shown in step S102. Note that the position of the step S102 is the rotary ENC position, but may be the linear ENC position.

By this, the rotary ENC position of the lever drive region is set to "POSITION<ORIGIN−dx1". The distance dx1 is a distance from the origin position to the lever drive region.

The rotary ENC position of the cam drive region is set to "ORIGIN≤POSITION<ORIGIN+dx2". The distance dx2 is a distance from the origin position to the rack and pinion drive region.

The rotary ENC position in the rack and pinion drive region is set to "ORIGIN+dx2≤POSITION". The values dx1 and dx2 are stored in the nonvolatile memory 124 as part of the control parameter 126 (see FIG. 4)."

Note that the lengths of the lever drive region and the rack and pinion drive region are also stored in the nonvolatile memory 124 as part of the control parameters 126 (see FIG. 4).

Next, when the line head 40 is to be moved (Yes in step S103), the control section 100 determines whether or not a print mode is a normal mode (step S104). As the print mode, the user can select the normal mode or a speed priority mode via the operation section 115.

In the case of the normal mode, the control section 100 temporarily stops the line head 40 before a region boundary and selects the control parameters in each area (step S105). In the case of the speed priority mode, the control section 100 continuously drives the line head 40 without stopping the line head 40 at the region boundary and selects the control parameters in each region (step S106).

The control parameters for each region are stored in the nonvolatile memory 124 as part of control parameters 126 (see FIG. 4). The control parameters of each region include a torque limit value of the head movement motor 101. The torque limit value is, as an example, a limit value of a duty signal sent to the motor driver 122 and, by this, the drive current value of the head movement motor 101 is limited. The torque limit value for each region is stored in the nonvolatile memory 124 as part of the control parameters 126 (see FIG. 4). By setting the torque limit value, an excessive load is suppressed from being applied to the drive mechanism when an abnormality occurs.

FIG. 27 shows the head movement speed, the motor rotation speed, the motor drive load, and the torque limit value for each region the line head 40 in the case the head is raised and in the case where it is lowered. When the line head 40 is lowered, the head movement speed is the lowest speed in the first region Am1, that is, in the case of the cam drive, the highest speed in the second region Am2, that is, in the case of the rack and pinion drive, and intermediate in the third region Am3, that is, in the case of the lever drive. When the line head 40 is lowered, the motor rotation speed is speed 2 in each region. However, for example, in order to reduce an impact when the line head 40 comes into contact with an obstacle in the second region Am2 or the third region Am3, the speed may be set to be a lower speed than the speed 2.

When the line head 40 is lowered, the drive load of the head movement motor 101 is the smallest in the first region Am1 and the second region Am2 and is larger in the third region Am3 than in the first region Am1 and the second region Am2. Therefore, when the line head 40 is lowered, the torque limit value is smallest in the first region Am1 and the second region Am2 and is larger in the third region Am3 than in the first region Am1 and the second region Am. This is because, in the third region Am3, the push-down section 75 pushes down the line head 40 against the spring force of the coil spring 54 (see FIG. 20) or the cap springs 63 (see FIG. 20). This appears in the motor duty in the lever drive region shown in FIG. 22. When the line head 40 lowered, in the third region Am3, the head movement motor 101 first receives a load from the coil spring 54, and then receives a load from both the coil spring 54 and the cap springs 63. Accordingly, the lower the line head 40 is, the larger the motor duty is. Therefore, the torque limit value is largest in the third region Am3.

Next, when the line head 40 is raised, the head movement speed is the lowest speed in the first region Am1, that is, in the case of the cam drive, the highest speed in the second region Am2, that is, in the case of the rack and pinion drive, and the intermediate in the third region Am3, that is, in the case of the lever drive. When the line head 40 raised, the motor rotation speed is speed 1 in each region. However, for example, in order to reduce impact when the line head 40 comes into contact with an obstacle in the second region Am2 or the third region Am3, the speed may be set to be lower speed than the speed 1. Note that the speed 1 may be equal to the speed 2, may be higher than the speed 2, or may be lower than the speed 2.

When the line head 40 is raised, the drive load of the head movement motor 101 is the smallest in the third region Am3 and the first region Am1 and is larger in the second region Am2 than the first region Am1 and the third region Am3. However, when the line head 40 raised, the torque limit value is the largest in the third region Am3. This is because, when biting occurs in the worm gear mechanism at the time of head lowering, there is a concern that a motor drive load larger than the motor drive load at the time of head lowering is applied at the time of head raising. Note that the torque limit value is the smallest in the first region Am1 and is larger in the second region Am2 than in the first region Am1.

Next, with reference to FIG. 25, a description will be given of a process of performing origin detection of the line head 40 by raising the line head 40 from a state in which the line head 40 is placed on the upstream support section 46 via the protruding sections 40*a*.

The control section 100, in a state where the line head 40 is placed on the upstream support section 46 via the protruding sections 40*a*, starts driving the head movement motor 101 so as to raise the line head 40 (step S201). Next, when the signal change of the linear ENC 107 appears (Yes in step S202), assuming that the number of edges of the output pulses of the linear ENC 107 is Ce1, it sets the origin position based on the linear ENC 107 to before the number Ce1 edge (step S203). An example of the edge number Ce1 is 1.

Next, the control section 100 sets the origin position based on the rotary ENC 103 to the before the number Ce1×(Rs1/Rs2) edge (step S204). Here, Rs1 is the resolution of the rotary ENC 103, specifically, it is the number of edges of the output pulse of the rotary ENC 103 with respect to the unit movement amount of the line head 40. Rs2 is the resolution of the linear ENC 107, specifically, it is the number of edges of the output pulse of the linear ENC 107 with respect to the unit movement amount of the line head 40.

By setting the origin position of the line head 40 in this manner, it is possible to accurately set the origin position of the line head 40.

Next, with reference to FIG. 26, a description will be given of a process of performing origin detection of the line head 40 by lowering the line head 40 from a state in which the protruding sections 40*a* of the line head 40 separate from the upstream support section 46.

The control section 100 starts driving the head movement motor 101 so as to lower the line head 40 (step S301). Next, when the signal of the linear ENC 107 stops changing (Yes in step S302), and if there is signal change from the rotary ENC 103 (Yes in step S303), it sets as the origin position, based on the linear ENC 107, the linear ENC position at the time when the signal of the linear ENC 107 stopped changing (step S304). The control section 100 sets as the origin position, based on the rotary ENC 103, the rotary ENC position at the time when the signal of the linear ENC 107 stops changing (step S305). By setting the origin position of the line head 40 in this manner, it is possible to accurately set the origin position of the line head 40.

Figure 24:
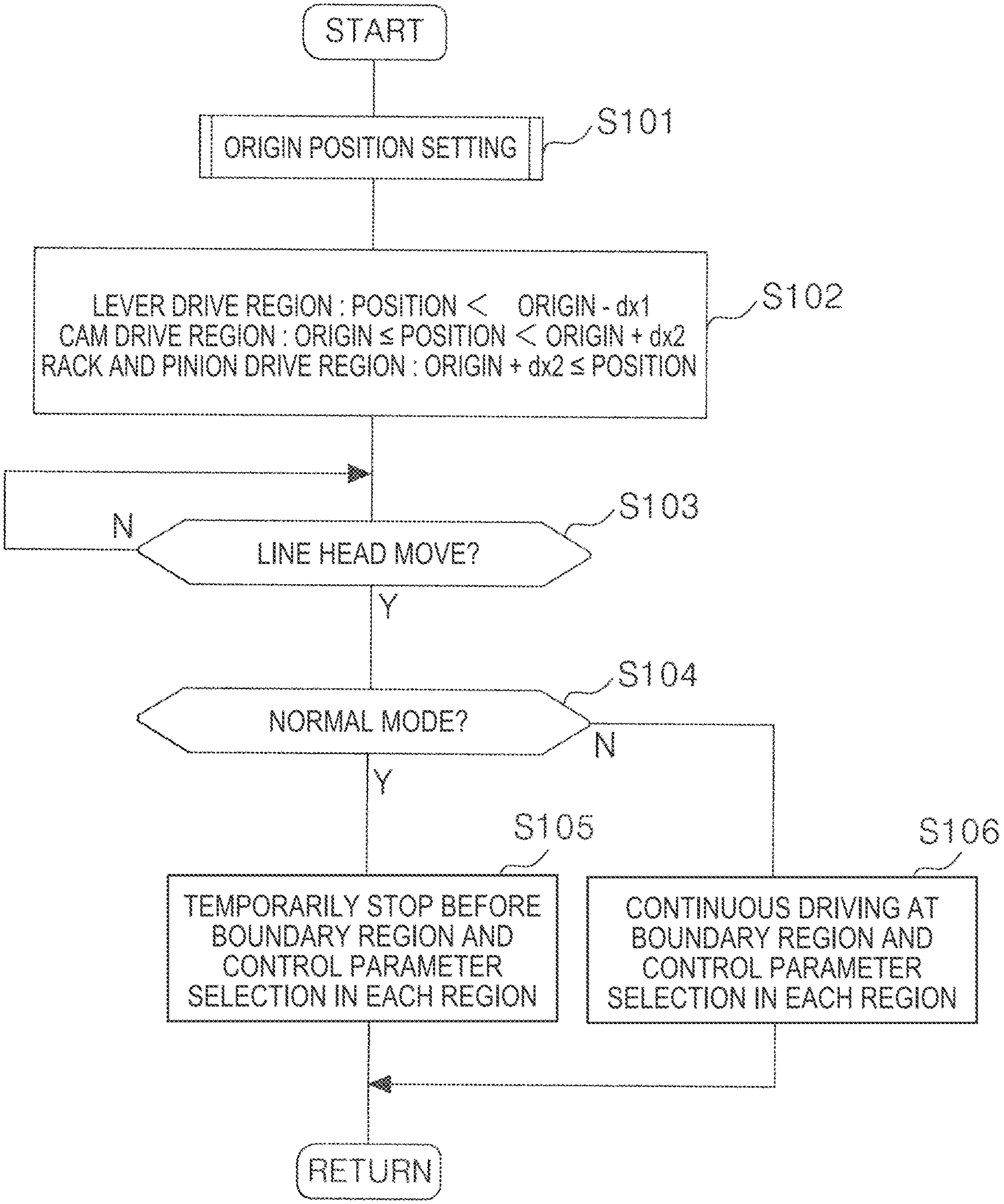
FIG. 24 is a flowchart showing a flow of process performed by the control section.
Figure 25:
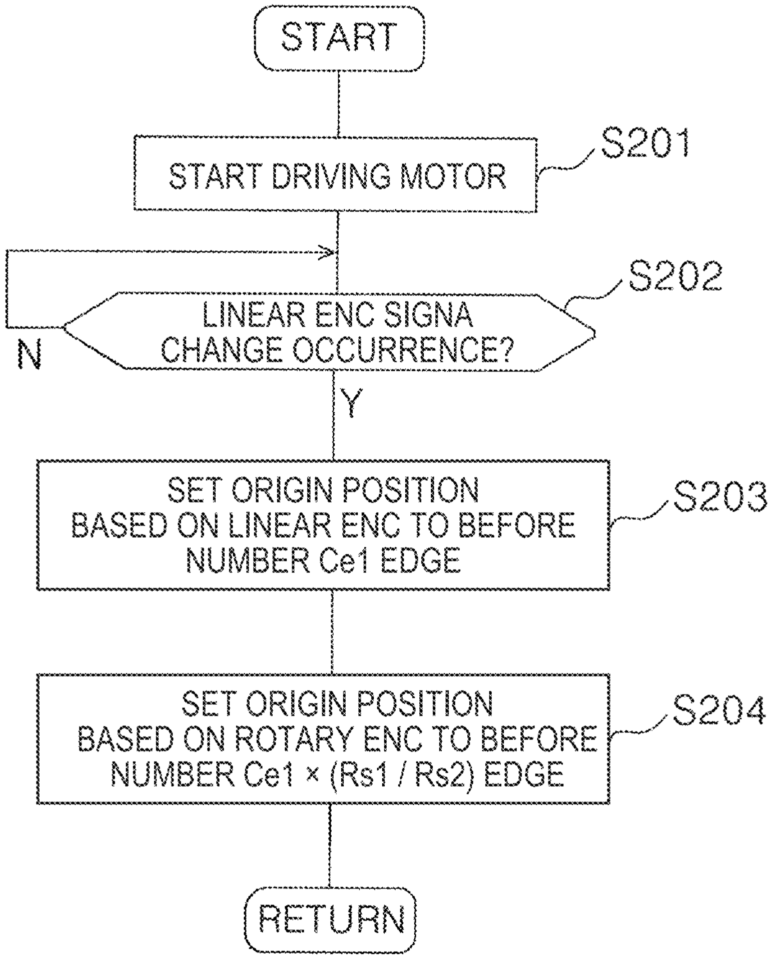
FIG. 25 is a flowchart showing a flow of process when performing an origin position setting while raising the line head.
Figure 26:
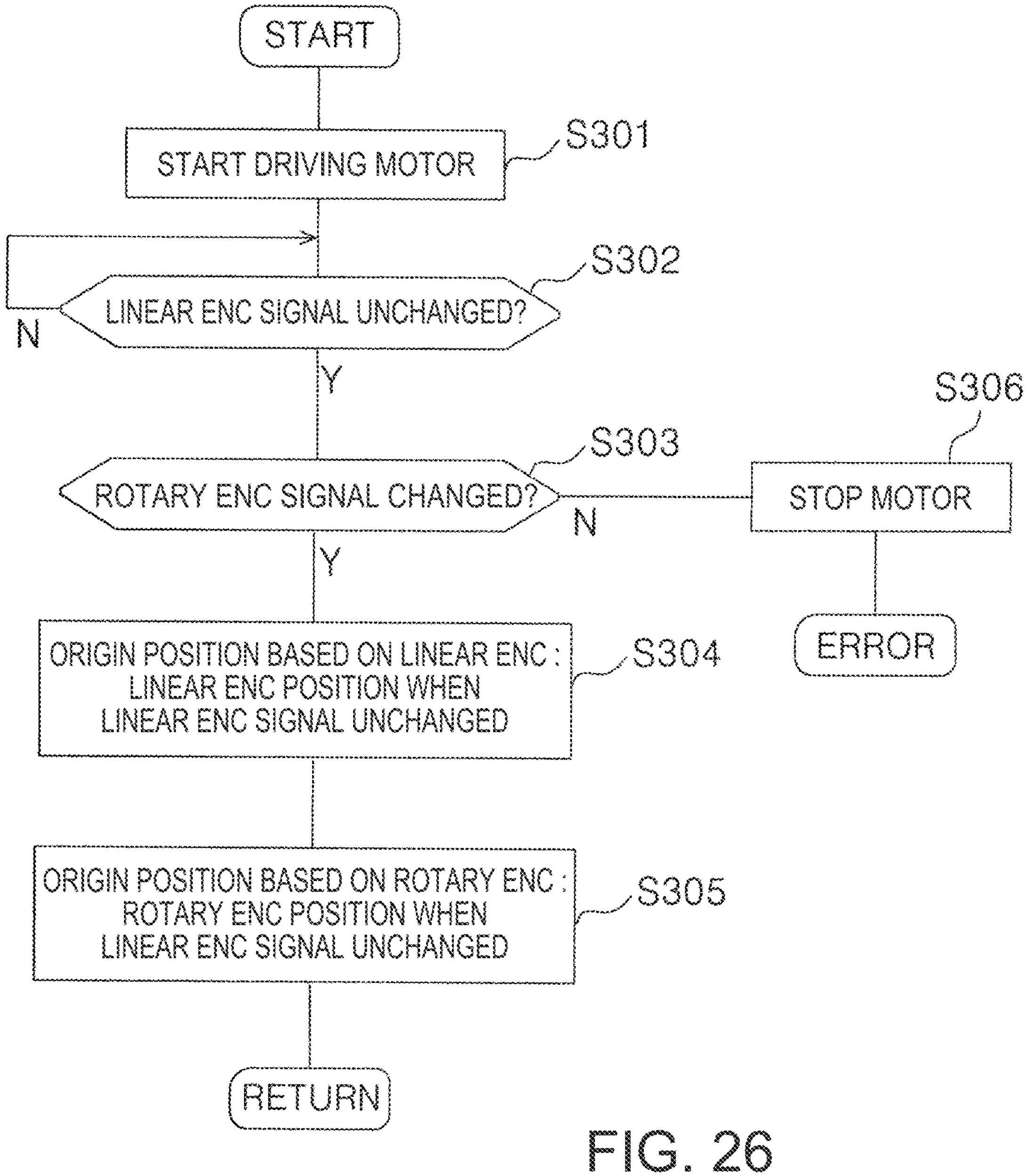
FIG. 26 is a flowchart showing a flow of process when performing the origin position setting while lowering the line head.

The origin position setting in step S101 of FIG. 24 may employ the process shown in FIG. 25 or may employ the process shown in FIG. 26.

Note that when the signal of the linear ENC 107 stops changing (Yes in step S302), and if the signal of the rotary ENC 103 stops changing (No in step S303) even though the head unit 30 is in the movement region of the line head 40, it is determined that the head unit 30 contacts against some obstacle, the head movement motor 101 is stopped (step S306), and an error process is performed. As an example of the error process, it causes the operation section 115 to display an alert indicating that an abnormality has occurred.

By this, it is possible to suppress an excessive load from being applied to the line head 40 or the movement unit 110 and to suppress damage to the line head 40 or the movement unit 110.

Note that the movement unit 110 has backlash such as gear backlash. Therefore, in particular, after setting the origin position of the line head 40 while lowering the line head 40, in a case where raising the line head 40, that is, in a case where raising the line head 40 based on the origin position of the rotary ENC 103, it is desirable to set the target stop position of the head movement motor 101 taking the backlash amount into consideration.

Next, a process when the power of the printer 1 is not turned off in a normal procedure will be described with reference to FIG. 28. When the printer 1 is turned off in a normal procedure, specifically, when the power is turned off by a user pressing a power button (not shown), then the line head 40 is moved to the capping position. Therefore, in this case, when power of the printer 1 is turned on, the control section 100 can determine that the line head 40 is at the capping position. However, when power of the printer 1 is not turned off in the normal procedure, for example, in a case where a power cord is pulled while the power is on, when the printer 1 is turned on thereafter, the control section 100 cannot grasp the accurate current position of the line head 40. Therefore, in this case, an exception process is required to grasp the current position of the line head 40.

Note that it is also possible to grasp the position of the line head 40 by contacting the line head 40 against one side end portion or the other side end portion of the movement region and detecting an increase in the drive current value of the head movement motor 101 at that time. However, this method is not desirable because excessive surface pressure is generated between the worm wheel 83 (see FIG. 9) and the cylindrical worm 84 (see FIG. 9) constituting the worm gear mechanism, and there is a concern that may cause locking.

Note that whether or not the power of the printer 1 was turned off in the normal procedure can be determined by storing a power flag indicating that the power of the printer 1 is turned off in the normal procedure in the nonvolatile memory 124 (see FIG. 4). For example, when the power of the printer 1 is turned off in the normal procedure, the control section 100 stores "1" as the power flag in the nonvolatile memory 124. Then, the control section 100 reads the power flag when power of the printer 1 is turned on and, if the power flag is "1", then the control section 100 performs the origin position setting by the normal procedure (step S101 in FIG. 24). At this time, the power flag is reset to "0".

Figure 28:
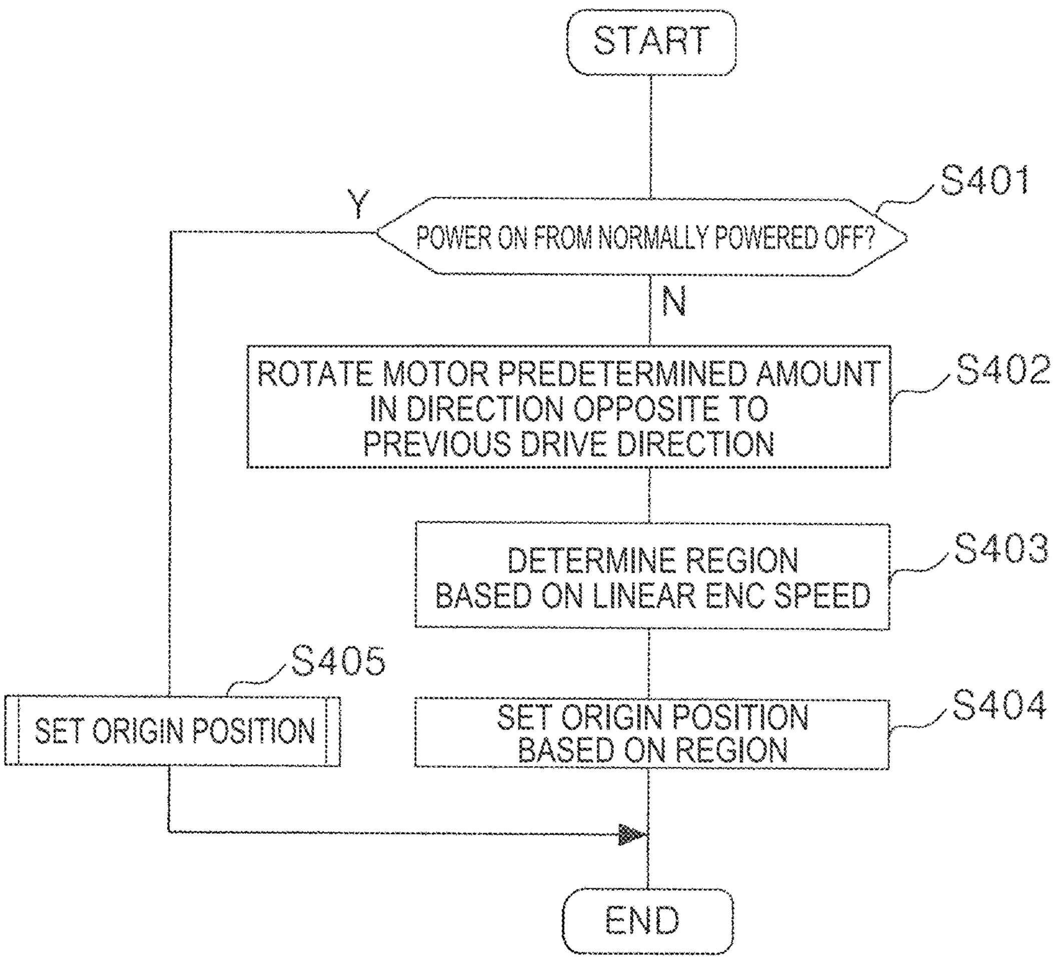
FIG. 28 is a flowchart showing a flow of process when it is determined that from power being off to power being turned on was not normal.

When power of the printer 1 is turned on, the control section 100 reads the power flag and, if the power flag is "0", then the control section 100 assumes that the power of the printer 1 was not turned off in the normal procedure and performs the exception process shown in FIG. 28.

In FIG. 28, when power of the printer 1 is turned on, the control section 100 determines whether or not the power was turned on after being turned off normally (step S401). If power was turned on after being turned off normally (Yes in step S401), then the normal origin position setting is performed (step S405). Note that the process of step S405 is the same as the process of step S101 of FIG. 24.

If power was turned on after not being turned off normally (No in step S401), then the control section 100 drives the head movement motor 101 by a predetermined amount in a direction opposite to the previous drive direction (step S402).

Here, the previous drive direction was the drive direction when the control section 100 previously drove the head movement motor 101. The control section 100 stores a direction flag indicating the rotation direction in the nonvolatile memory 124 (see FIG. 4) each time the head movement motor 101 is driven. The control section 100 can grasp the rotation direction from when the head movement motor 101 was driven last time by reading the direction flag.

"Predetermined amount" in step S402 is desirably as small as possible within a range in which the linear ENC speed can be detected. For example, a "predetermined amount" is desirably equal to or less than 5.0 mm and more desirably equal to or less than 3.0 mm, when converted into the movement amount of the line head 40. The "predetermined amount" is stored in the nonvolatile memory 124 as part of the control parameters 126 (see FIG. 4). By minimizing the "predetermined amount" in this manner, it is possible to suppress the locking of the worm gear mechanism described above caused by the line head 40 being in contact with some kind of obstacle when the line head 40 is moved.

Next, the control section 100 determines in which region the line head 40 is currently positioned based on the linear ENC speed (step S403). As described with reference to FIG. 27, the movement speed of the line head 40, that is, the linear ENC speed is different in each of the first region Am1, the second region Am2, and the third region Am3. That is, the linear ENC speed when the head movement motor 101 is rotated at a predetermined rotation speed is different in each region and can be acquired as a known value. Accordingly, the control section 100 can determine which region the line head 40 is in based on the linear ENC speed. Of course, if the linear ENC speed is zero when the head movement motor 101 is rotated at the predetermined rotation speed, it can be determined that the line head 40 is in the motor idling region of FIG. 22 and FIG. 23. The movement speed of the line head 40 in each region, when the head movement motor 101 is rotated at the predetermined rotation speed, is stored in the nonvolatile memory 124 as a part of the control parameters 126 (see FIG. 4). Of course, the movement speed is a value having a width taking error into consideration.

If it can be determined in which region the line head 40 is in, it is possible to determine in which direction the line head 40 should be moved in order to set the origin position. Therefore, the control section 100 performs the origin position setting based on which area the line head 40 is in (step S404). For example, if the line head 40 is in the second region Am2 or the first region Am1, it is possible to set the origin position by lowering the line head 40. If the line head 40 is in the third region Am3 or the motor idling region, it is possible to set the origin position by raising the line head 40. The origin position setting due to the raising of the line head 40 is a process shown in FIG. 25 and the origin position setting due to the lowering of the line head 40 is a process shown in FIG. 26.

Note that when the linear ENC speed is zero when the head movement motor 101 is rotated at the predetermined rotation speed, a case where the line head 40 is in the motor idling region and a case where the line head 40 contacts with some portion and cannot move are conceivable. However, in step S402, the head movement motor 101 is driven in a direction opposite to the previous drive direction. Therefore, it is possible to at least avoid that the line head 40 enters a state of being unable to move due to contact with one side end portion or the other side end portion of the movement region.

As described above, even when the power of the printer 1 is not turned off in the normal procedure, the current position of the line head 40 can be grasped based on the detection information of the rotary ENC 103 and the linear ENC 107. In that case, it is possible to suppress the occurrence of locking of the worm gear mechanism described above.

Note that in the above described embodiment, the control section 100 determines in which region the line head 40 is currently positioned based on the linear ENC speed. However, instead of the linear ENC speed, a motor drive load, specifically, a motor drive current value may be adopted. This is because the motor drive load, that is, the motor drive current value, is different in each region.

Note that if the shutter 47 (see FIG. 5) is closed, the line head 40 is in the first region Am1 or the second region Am2. Therefore, when a sensor that detects the position of the shutter 47 is provided, the position of the line head 40 may be grasped with reference to the position of the shutter 47.

When a sensor that detects the cap unit 60 is at the lowered position is provided, the position of the line head 40 may be grasped with reference to the state of the sensor. For example, if the cap unit 60 is not in the lowered position, the line head 40 is then lowered. Thus, when the lowered position of the cap unit 60 is detected, it can be determined that the line head 40 is in the capping position.

Hereinafter, operational effects of the printer 1 configured as described above will be described. First, as described above, the movement direction of the line head 40 includes a vertical component. A position detecting unit for detecting the position of the line head 40 with respect to the medium transport path Ta is the linear ENC 107. The linear ENC 107 includes the linear scale 108, which is provided along the movement direction of the line head 40, and the first detection section 109, which is a detection section provided in the line head 40 and for detecting the linear scale 108.

The movement unit 110, which moves the line head 40 by receiving the power of the head movement motor 101, has a configuration that allows idle rotation of the head movement motor 101 after the line head 40 is placed on the facing section 45 under its own weight when the line head 40 is lowered toward the facing section 45. The idle rotation of the head movement motor 101 corresponds to the rotation of the head movement motor 101 in the motor idling region shown in FIG. 22 and FIG. 23. That is, idle rotation of the head movement motor 101 means a state in which the rotation of the head movement motor 101 is not converted into movement of the line head 40 and also a state in which the head movement motor 101 does not receive a load from the line head 40.

Then, the control section 100 grasps the position of the line head 40 in the movement direction based on a change in the detection signal of the linear ENC 107 (linear ENC position Pn0 in FIG. 22) when the line head 40 is placed on the facing section 45 during lowering of the line head 40 or based on a change in the detection signal of the linear ENC 107 (linear ENC position Pn0 in FIG. 23) when the line head 40 rises up from the state of being placed on the facing section 45.

By this, the position of the line head 40 with respect to the facing section 45 can be appropriately grasped and thus the platen gap can be appropriately set. The line head 40 can be appropriately positioned at the capping position Hp0 or the jam processing position Hp2.

In addition, since the platen gap can be accurately set, adjustment in the assembly process of the device becomes unnecessary and assembly time can be shortened. Even when the parts are deformed from the assembled state by an impact during transportation of the device, it is easy to obtain a platen gap as intended.

Even when a member such as a gear constituting the movement unit 110 is worn due to aging deterioration, it is unlikely to affect the platen gap.

The movement unit 110 is configured to, in a case where lowering the line head 40 toward the facing section 45, enable idle rotation of the head movement motor 101 after the line head 40 is placed on the facing section 45 under its own weight, and because of this the following operational effects can be obtained.

For example, in the case of a configuration in which the position of the line head 40 in the movement direction is grasped by detecting an increase in the drive current value of the head movement motor 101 when the line head 40 contacts with the facing section 45, a load is applied to the movement unit 110 and there is a concern that this may cause a component to break. It may also be difficult to appropriately set the threshold of the drive current value. When the movement unit 110 includes the worm gear mechanism (see FIG. 9) as in the present embodiment, there is also a concern that excessive surface pressure will be generated between the worm wheel 83 and the cylindrical worm 84 and cause locking. However, the movement unit 110 has a configuration that, in a case where the line head 40 is lowered toward the facing section 45, allows idle rotation of the head movement motor 101 after the line head 40 is placed on the facing section 45 by use of its own weight. By this, it is possible to suppress the occurrence a failure as described above.

In the present embodiment, the rotary ENC 103, which is a rotation detecting unit that detects the rotation of the head movement motor 101, is provided. Then, the control section 100 grasps the position of the line head 40 in the movement direction based on the detection signal of the linear ENC 107 and the detection signal of the rotary ENC 103. By this, the position of the line head 40 in the movement direction can be accurately grasped.

In the present embodiment, the above described rotation detecting unit is the rotary ENC 103 including the rotary scale 104 provided on the motor output shaft of the head movement motor 101 and the second detection section 105 for detecting the rotary scale 104. By this, it is possible to accurately detect the rotation of the head movement motor 101.

The movement unit 110 includes the cylindrical worm 84, which is driven by the head movement motor 101, and the worm wheel 83, which meshes with the cylindrical worm 84 and rotates with the rotation of the cylindrical worm 84. In such a configuration, if excessive surface pressure is generated between the worm wheel 83 and the cylindrical worm 84 as described above, there is also a concern that locking may occur. However, as described above, since an excessive load is not applied to the movement unit 110 when grasping the position of the line head 40 with respect to the facing section 45, it is possible to suppress the occurrence of locking.

In addition, by the worm gear mechanism, it is possible to increase the deceleration ratio when power is transmitted from the head movement motor 101 to the line head 40. As a result, the resolution of the rotary ENC 103 can be made larger than the resolution of the linear ENC 107 and the line head 40 can be accurately positioned with respect to the facing section 45.

The control section 100 sets the origin position of the line head 40 in the movement direction based on the position (linear ENC position Pn0 in FIG. 22) of the line head 40 at the time when the signal of the linear ENC 107 stops changing during rotation of the head movement motor 101 while the line head 40 is being lowered toward the facing section 45 or the position (linear ENC position Pn0 in FIG. 23) of the line head 40 at the time when the signal of the linear ENC 107 changes during rotation of the head movement motor 101 while the line head 40 is being raised from the state of being placed on the facing section 45.

In other words, the control section 100 sets the origin position of the line head 40 in the movement direction based on the position (linear ENC position Pn0 in FIG. 22) of the line head 40 when the signal of the linear ENC 107 stops changing during the state where signal change of the rotary ENC 103 exists while the line head 40 is being lowered toward the facing section 45 or based on the position (linear ENC position Pn0 in FIG. 23) of the line head 40 when signal change of the linear ENC 107 exists during the state where the signal change of the rotary ENC 103 exists while the line head 40 is being raised from the state of being placed on the facing section 45.

The control method realized by the control section 100 includes the step for setting the origin position of the line head 40 in the movement direction based on the position of the line head 40 when signal changes of the linear ENC 107 stop during a state where signal change of the rotary ENC 103 exists while lowering the line head 40 toward the facing section 45 or based on the position of the line head 40 when signal change of the linear ENC 107 exists during a state in which signal change of the rotary ENC 103 exists while the line head 40 is being raised from the state of being placed on the facing section 45.

By this, it is possible to appropriately set the origin in the movement direction of the line head 40 by using signal change of the linear ENC 107. As a result, the positioning accuracy of the line head 40 is improved.

The line head 40 includes the protruding sections 40*a* protruding toward the facing section 45 and by the protruding sections 40*a* contacting the facing section 45, the line head 40 is placed on the facing section 45 by use of its own weight. Accordingly, it is possible to avoid contact between a portion where recording is performed on the medium in the line head 40, specifically, the head chip 43 (see FIG. 2) and the facing section 45. As a result, the occurrence of damage to the head chip 43 can be suppressed and contamination of the facing section 45 can be suppressed.

By providing the plurality of protruding sections 40*a* in the medium width direction and bringing the protruding sections 40*a* in contact with the facing section 45, the posture of the line head 40 with respect to the facing section 45 is also appropriately determined.

Therefore, for example, the position of the line head 40 when the protruding sections 40*a* are in contact with the facing section 45 may be set as the first recording position. By this, the platen gap can be set very appropriately and the parallelism of the line head 40 with respect to the facing section 45 can be ensured, so that appropriate recording quality can be obtained.

Note that in order to grasp the posture of the line head 40 with respect to the facing section 45, a plurality of linear ENCs 107 may be provided at intervals in the X-axis direction, thereby detecting the posture of the line head 40 with respect to the facing section 45. At that time, in order to correct the posture of the line head 40 with respect to the facing section 45, the rotating body 74A provided the vicinity of the end portion of the shaft 77 in the +X direction and the rotating body 74B provided the vicinity of the end portion in the −X direction may be driven by separate motors.

In the present embodiment, the movement unit 110 has the deceleration mechanism 76 having the deceleration ratio of greater than 1 when power is transmitted from the head movement motor 101 to the recording head. The control section 100 grasps the position of the line head 40 in the movement direction based on the signal of the linear ENC 107 and controls the head movement motor 101 based on the signal of the rotary ENC 103. In other words, the control method realized by the control section 100 includes the step for grasping the position of the line head 40 in the movement direction based on the signal of the linear ENC 107 and controlling the head movement motor 101 based on the signal of the rotary ENC 103.

According to this configuration, since the movement of the line head 40 is directly detected by the linear ENC 107, the position of the line head 40 can be appropriately grasped. As a result, it becomes easy to appropriately adjust the gap between the line head 40 and the facing section 45.

By referring to the detection signal of the linear ENC 107 during motor control based on the detection signal of the rotary ENC 103, the position of the line head 40 can be accurately grasped without being affected by backlash of the gears that constitute the movement unit 110.

Here, since the linear ENC 107 is configured to directly detect the movement of the line head 40, there is a concern that stopping accuracy when stopping the head movement motor 101 may not be obtained due to the resolution of the linear ENC 107. As a result, there is a concern that the line head 40 cannot be accurately stopped at a desired position. However, in the present embodiment, the movement unit 110 has the deceleration mechanism 76 having the deceleration ratio of greater than 1 when power is transmitted from the head movement motor 101 to the line head 40. Therefore, the resolution of the rotary ENC 103 can be secured. By controlling the head movement motor 101 based on the signal of the rotary ENC 103, it is possible to improve stopping accuracy when stopping the head movement motor 101 and it becomes easy to accurately stop the line head 40 at a desired position.

The control section 100 detects each region constituting the movement region based on the origin position of the line head 40 in the movement direction and controls the head movement motor 101 with the control parameters corresponding to each region. Therefore, the line head 40 can be appropriately positioned by appropriate control according to each region.

The control parameters include the torque limit value of the head movement motor 101. By this, the following operational effects can be obtained.

When the load applied to the head movement motor 101 is different in each region constituting the movement region of the line head 40, the necessary motor drive torque is different. Therefore, if the large torque limit value is set for a region with a small load, an excessive load is applied to mechanism parts when an abnormality occurs, and there is a concern that breakage of the mechanism parts may be caused.

However, since the control parameters include the torque limit value of the head movement motor 101, it is possible to suppress breakage or the like of the above described mechanism parts.

Note that the control parameters may be other parameters such as the target speed of the head movement motor 101, the gain Kp of the PID control, or two or more of these parameters.

The control section 100 temporarily stops the head movement motor 101 at the boundary of each region constituting the movement region (step S105 in FIG. 24). That is, at the boundary of each region constituting the movement region of the line head 40, there is a concern that collision noise between members could occur with the switching of the drive mechanism. However, it is possible to suppress the occurrence of collision noise by temporarily stopping the head movement motor 101 at the boundary of each region constituting the movement region.

Note that instead of temporarily stopping the head movement motor 101, the speed of the head movement motor 101 may be reduced.

The printer 1 includes the operation section 115, which is an example of a reception unit, that receives selection of either the speed priority mode or the normal mode as the print mode when the line head 40 is moved. When the speed priority mode is selected, the control section 100 continuously drives the head movement motor 101 at the boundary between the regions constituting the movement region (step S106 in FIG. 24). When the normal mode is selected, the control section 100 temporarily stops the head movement motor 101 at the boundary of each region constituting the movement region (step S105 in FIG. 24).

At the boundary of each region constituting the movement region of the line head 40, there is a concern that collision noise between the members occurs with the switching of the drive mechanism. However, in the normal mode, since the head movement motor 101 is temporarily stopped at the boundary of each region constituting the movement region of the line head 40, it is possible to suppress the occurrence of the collision noise described above.

In the speed priority mode, since the head movement motor 101 is continuously driven at the boundary of each region constituting the movement region of the line head 40, it is possible to improve the throughput of the process.

Hereinafter, modifications of the above described embodiment will be described.

The medium transport path Ta described above is not limited to being parallel to the X-Y plane and may have an angle with respect to the X-Y plane. Therefore, the movement direction of the line head 40 is not limited to parallel to the Z-axis direction and may have an angle with respect to the Z-axis direction.

Instead of providing the protruding sections 40*a* at positions where they contact the upstream support section 46, they may be provided at positions where they contact the shutter 47.

The control section 100 may use the encoder to control the head movement motor 101 selectively according to the operation. For example, when performing the origin detection operation, the head movement motor 101 may be controlled based on the output signal of the linear ENC 107. After the origin detection operation is performed, the head movement motor 101 may be controlled based on the output signal of the rotary ENC 103.

The head movement motor 101 may be controlled based on the output signal of the linear ENC 107 and when the origin detection is started due to speed reduction, the control may be switched to the control using the rotary ENC 103 during drive. Also, by performing switching of the target position, that is, conversion from the linear ENC position to the rotary ENC position, seamlessly during driving, it is possible to improve the throughput because it does not involve deceleration, stop, or acceleration.

Furthermore, the present disclosure is not limited to the embodiments and modifications described above, various modifications are possible within the scope of the disclosure described in the claims, it is needless to say that they are also included in the scope of the present disclosure.

What is claimed is:

1. A recording device comprising:

a transport path configured to transport a medium;

a recording section that is a recording section configured to perform recording on the medium and that is configured to move in a direction of advancing and retreating with respect to the transport path;

a facing section disposed facing the recording section;

a motor that is a power source when the recording section is moved;

a movement unit configured to move the recording section by receiving power from the motor;

a position detecting unit configured to detect a position of the recording section with respect to the transport path; and a control section configured to control the motor, wherein a movement direction of the recording section includes a vertical direction component, the position detecting unit is a linear encoder and includes a linear scale provided along the movement direction of the recording section and a first detection section that is a detection section provided in the recording section and that is configured to detect the linear scale, the movement unit has a configuration in which, in a case where the recording section is lowered toward the facing section, idle rotation of the motor is allowed after the recording section is placed on the facing section by its own weight, and the control section grasps the position of the recording section in the movement direction based on a change in the detection signal of the position detecting unit when the recording section is placed on the facing section or a change in the detection signal of the position detecting unit when the recording section rises from a state of being placed on the facing section.

2. The recording device according to claim 1, further comprising:

a rotation detecting unit configured to detect rotation of the motor, wherein the control section grasps the position of the recording section in the movement direction based on the detection signal of the position detecting unit and the detection signal of the rotation detecting unit.

3. The recording device according to claim 2, wherein the rotation detecting unit is a rotary encoder and includes a rotary scale provided on an output shaft of the motor and a second detection section configured to detect the rotary scale.

4. The recording device according to claim 3, wherein the movement unit includes a cylindrical worm driven by the motor and a worm wheel that is configured to mesh with the cylindrical worm and that is configured to rotate with rotation of the cylindrical worm.

5. The recording device according to claim 1, wherein the control section sets an origin position of the recording section in the movement direction based on a position of the recording section at a time when a signal change of the linear encoder disappears during rotation of the motor when the recording section is lowered toward the facing section or a position of the recording section at a time point when the signal change of the linear encoder appears during rotation of the motor when the recording section is raised from a state of being placed on the facing section.

6. The recording device according to claim 1, wherein the recording section includes a protruding section protruding toward the facing section and by the protruding section contacting the facing section, the recording section is placed on the facing section by its own weight.

7. The recording device according to claim 1, wherein a movement region of the recording section includes a first region and a second region farther from the transport path than the first region, the movement unit includes a first movement section configured to move the recording section in the first region and a second movement section configured to move the recording section in the second region, the recording section when transitioning from the first region to the second region, transitions from a state of being moved by the first movement section to a state of being moved by the second movement section and when transitioning from the second region to the first region, transition from a state of being moved by the second movement section to a state of being moved by the first movement section, and the first movement section and the second movement section are both driven by the motor.

8. The recording device according to claim 7, wherein the first movement section includes a cam that is a cam rotated by the power of the motor and that is configured to move the recording section by being rotated in a state of supporting the recording section and the second movement section includes a rack provided in the recording section and a pinion that is a pinion configured to mesh with the rack and that is configured to move the recording section by being rotated by the power of the motor.

* * * * *